(12) United States Patent
Tippett

(10) Patent No.: US 7,383,747 B2
(45) Date of Patent: Jun. 10, 2008

(54) APPARATUS AND METHOD FOR GYROSCOPIC PROPULSION

(75) Inventor: Raymond Kelly Tippett, Mesa, AZ (US)

(73) Assignee: Ganid Productions, LLC, Mesa, AZ (US)

( * ) Notice: Subject to any disclaimer, the term of this patent is extended or adjusted under 35 U.S.C. 154(b) by 0 days.

(21) Appl. No.: 11/581,809

(22) Filed: Oct. 16, 2006

(65) Prior Publication Data

US 2007/0034029 A1 Feb. 15, 2007

Related U.S. Application Data

(60) Division of application No. 10/770,795, filed on Feb. 3, 2004, now Pat. No. 7,121,159, which is a continuation-in-part of application No. 10/087,430, filed on Mar. 1, 2002, now Pat. No. 6,705,174.

(51) Int. Cl.
*G01C 19/02* (2006.01)
*G01C 19/54* (2006.01)

(52) U.S. Cl. ........................... 74/5.22; 74/5.4

(58) Field of Classification Search ................ 74/5.22, 74/5.34, 5.37, 5.4, 5.42, 5.46, 5.47, 5.7, 5 F, 74/5.95; 114/360; 244/79, 93, 165, 3.21, 244/3.23

See application file for complete search history.

(56) References Cited

U.S. PATENT DOCUMENTS

| | | | | | |
|---|---|---|---|---|---|
| 2,432,430 | A | * | 12/1947 | Luboshez | 74/5.37 |
| 2,752,791 | A | * | 7/1956 | Jarosh et al. | 74/5.6 D |
| 2,856,142 | A | * | 10/1958 | Haviland | 244/93 |
| 2,857,122 | A | * | 10/1958 | Maguire | 244/93 |
| 2,953,926 | A | * | 9/1960 | Wrigley et al. | 74/5.37 |
| 3,214,982 | A | * | 11/1965 | Sylvia | 74/5.7 |
| 3,456,513 | A | * | 7/1969 | Emerson | 74/5.47 |
| 4,825,716 | A | * | 5/1989 | Roberts et al. | 74/5.34 |
| 6,340,137 | B1 | * | 1/2002 | Davis et al. | 244/165 |

* cited by examiner

*Primary Examiner*—Roger Pang
(74) *Attorney, Agent, or Firm*—Wright Law Group, PLLC; Mark F. Wright

(57) ABSTRACT

The present invention is a combination of three interconnected gyroscopic ring-like rotating masses, with each of the three ring-like masses being configured to rotate in various planes, depending on the desired orientation. Regardless of the orientation of the three rings, each of the three interconnected rotating masses will share substantially the same center of gravity and generate a separate yet interactive kinetic energy and angular momentum in each of the three planes, thereby providing resistance to rotational forces from external sources. This is known as "equal force presence." Additionally, a series of pedestal supports for supporting the three ring-like masses is disclosed.

15 Claims, 22 Drawing Sheets

APPARATUS AND METHOD FOR GYROSCOPIC PROPULSION

RELATED APPLICATIONS

This application is a divisional of U.S. patent application Ser. No. 10/770,795, filed on Feb. 3, 2004, which patent application is now issued as U.S. Pat. No. 7,121,159 and which application is a continuation-in-part of U. S. patent application Ser. No. 10/087,430, filed on Mar. 1, 2002, now issued as U.S. Pat. No. 6,705,174, all of which are incorporated herein by reference.

BACKGROUND OF THE INVENTION

1. Technical Field

The present invention relates generally to rotational forces and more specifically relates to creating a linear movement from a system of rotational forces.

2. Background Art

Propulsion of an object not in contact with a relatively fixed body, for example the ground or a planet surface, is generally obtained only by movement of air or other gases in a direction substantially opposite to the movement of the object under the effect of the propulsion systems. In the absence of a suitable atmosphere, for example in space, propulsion is generally obtained by rocket systems or by other similar systems which involve the projection of particles at high velocity from the object, in the opposite direction of the object's intended travel. Such systems, by their very nature and design, require the consumption of significant quantities of fuel since the fuel or the byproducts of the consumption or expulsion of the fuel forms the particles to be projected.

Attempts have been made for many years to develop a propulsion system, which generates linear movement from a rotational drive. Examples of this type of arrangement are shown in a book entitled "The Death of Rocketry" published in 1980 by Joel Dickenson and Robert Cook.

However none of these previous arrangements has in any way proved satisfactory and if any propulsive effect has been obtained this has been limited to simple models. One of the problems with the previous attempts is the limited understanding of the true nature of the laws of motion and the nature of the physical universe. The laws of motion, as currently defined and used in the scientific community, are only accurate to a limited degree of precision. Many conditions and qualifications are required to apply them to the physical world, as it actually exists. This is far truer for the quantification of angular motion than it is for more linear motion. The laws of motion postulated by Newton are built upon his first law of inertia and are generally regarded as the foundation of Einstein's theory of relativity.

In the cosmos, everything is moving and there is no such thing that is perfectly static and motionless. The very first law of physics involves concepts that are only proper in a given frame of reference. Consider a body "at rest." The idea of "at rest" implies a lack of motion. However, the object is only "at rest" with respect to the relative motion of the object's immediate environment. Matter "at rest" is actually moving in patterns of motion that create the appearance of static motionlessness, yet the accumulated energies within the matter, in addition to the relative motion of the composite cosmic environment, is well known and provides sufficient evidence that everything is in a state of constant motion. Inertia, as it is generally referred to in relation to the laws of physics, represents relatively balanced force relationships creating relatively constant and stable motion patterns.

The basic formulas typically used to describe various angular forces are sufficient to explain only the most basic concepts relative to the behavior of spinning masses. They are the accepted formulas of Newtonian physics for linear motion applied to rotation with the linear components exchanged for angular ones. Rotational inertia is generally defined with the appropriate embellishments necessary to include the shape of the mass about the axis of rotation as an additional factor in the magnitude of the inertia.

Newton's first law of motion dealing with inertia and the inertial reference frames used in the calculation of linear forces do not, in the strictest sense, apply to rotational force associations. Inertial reference frames are usually linear by qualification and rotating frames of reference are never inertial. This fact is not a significant factor to include in the calculations of most linear forces. In most cases of ordinary motion, the angular components in the inertial reference frame are negligible. For example, air resistance is frequently a negligible factor in certain cases and, in those cases, can therefore be ignored. Or as the limitations of the linear velocity of things is ignored unless sufficiently close to the recognized maximum. Similarly, the non-linear components of most inertial reference frames ignored, and can be, for most ordinary kinds of motion. The additional factor of shape forever qualifies the angular motion aspects of particle associations with respect to the force of that association. This is the most meaningful and valuable factor separating the behavior of angular force from linear force.

Motion on a scale large enough with respect to the earth and the cosmic environment to be substantially non-linear can never be ignored. And this is not the case with most kinds of ordinary motion. In the fundamentals of physics, this fact is considered significant only for large-scale motions such as wind and ocean currents, yet "strictly speaking" the earth is not an inertial frame of reference because of its rotation. The earth's non-linear character is observed in the case of the Foucault pendulum, the Coriolis Effect, and also in the case of a falling object which does not fall "straight" down but veers a little, with the amount of deviation from its path dependant on the period of time that elapses during the fall. All events are subject to this fact to a greater or lesser extent.

The mathematical purpose of inertial reference frames is to isolate a motion event in order to identify force components. Acceleration will only be observed in systems that have a net force in a given direction and are not balanced or zero. Since this is only valid for the linear components of motion, it works well for all kinds of motion phenomena that are primarily linear in nature; the associated angular component being either idealized or considered negligible. Only the linear force aspects of any of these measurements hold precisely true to the formulas of mathematics describing them. To the degree that angular components of motion are associated with the reference frame used for measuring and calculating force relationships, and to the extent which these angular components are not included in the formulas for calculation, is to the degree these formulas are in error. The fact that angular reference frames cannot and do not represent inertial reference frames indicates that the effect of angular force is not so easily isolated in order to identify component effects.

Mathematical analysis of rotational forces reveals that the formulas describing rotational motion are also limited in additional respects. Motions that include anything more than ninety degrees of rotation cannot be used as true vectors. The fundamental technique of vectors, used to determine the composite result of the effect of multiple forces, will not work for rotational motion due to the inherent lack of integrity in the model. Individual angular displacements, unless they are small, can't be treated as vectors, though magnitude and direction of rotational velocity at a particular point in time and space can be given, which is necessary. But this alone is not sufficient, because the rules of vector mathematics do not hold with regard to the order of the addition of these forces.

If the displacement of an object is given by a series of rotational motions, the resulting angular position of the object is different depending on the order of the sequence of angular motions. Vector mathematics requires that addition be commutative (a+b+c=c+b+a). To calculate the motion of the precessional adjustments which multiple disturbing torques have on a spinning mass in a dynamic environment requires extremely complex mathematical calculations and is not accounted for in the previous attempts to translate rotational energy into linear movement.

The fact that these precessional adjustments can be affected by a strong magnetic field, and that there are no mathematical formulas that include this phenomenon as a factor of calculation, demonstrates that angular momentum is not fully predictable by the current formulas of mathematics and this is why there has been no true success in developing an apparatus which can efficiently and effectively use the angular momentum of a spinning mass to create a controlled linear movement.

The simple systems of motion that involve a magnitude of angular momentum that is relatively large with respect to the mass of the rotating body all exhibit nuances or nutation of precessional adjustment not described by the force components given by the accepted formulas of physics for angular motion. The Levitron is one excellent example, and there are additional examples that reveal how the rotating systems of motion in the natural environment are significantly more complicated than is typically described by the formulas associated with these patterns.

When these motions are recreated, using the accepted formulas for these patterns, the motion is not at all like the naturally observed versions and is sterile and fixed, lacking the nuances and nutation that exist in the cosmic environment. The nuances and nutation of spinning motions observed in nature are typically complex composite angular effects of the local cosmic environment, down to and including the immediate angular motions of observation. This is why a typical gyroscope tends to dispose its axis parallel to the earth's in an effort to achieve overall dynamic equilibrium within the total environment. All angular motion is affected by all other angular motions, at least to some degree and a close examination reveals that everything moving is affected to a certain extent. However, rotating systems of force generate a motion pattern that can be used to magnify this interactive effect and, therefore, reveal the influence of the cosmic environment on these patterns of revolving motion.

When the cosmic influences are analyzed, any and all of the motions of anything and everything include some factor of angular displacement. A perfectly straight line is only a concept with respect to a mathematical idea. In reality, nothing moves in absolutely linear displacements, to one degree or another, there is typically an angular component to all motions. Even the primarily linear trajectories associated with electromagnetic radiation are slightly curved and this phenomenon can be readily observed in the vast stretches of outer space. In many cases, the angular component of motion is negligible for all practical intents and purposes, in other cases, it is the primary force of action, but in no case is it non-existent.

Gravity is the reason: the closer an object is to a strong gravitational force, the greater the amount of angular displacement in the surrounding motions. Astrophysicists account for this influence on the light of far away galaxies and describe the effect as a gravitational lens. Gravity exerts a torque on all matter within its grasp. This is a factor that should be included in relativity's equivalence principle to further qualify otherwise pure linear acceleration. The angular paths of moving bodies create the inevitability of a cosmic torque in the spatial frame of any gravitational mass. The Coriolis Effect is a composite result of the force of gravity in association with the rotating circular path of any given rotating system. As it is ordinarily viewed, the effect on large-scale motions on the surface of any revolving sphere is with respect to linear latitude until reaching a minimum at the poles. A critical examination will show that the angular component of motion is the same everywhere on the planet. Only the angle, with respect to the direction of the force of gravity, changes from the equator to the poles. At the equator, the radius, with respect to the axis of rotation, is greatest; this maximizes the effect on linear motions and is used to advantage when launching rockets into orbit around a sphere.

This bending of motion associated with gravity is the fundamental requirement to achieve a universe that behaves as if having purely linear forces on all but the largest scale of cosmic proportions. All straight lines of motion are ultimately elliptical curves. Accordingly, without an improved understanding of the forces associated with spinning masses and the influence of the gravitational field that is associated with movement of objects in general, it will be impossible to create devices that maximize the use of spinning masses and rotational energy to create linear motion. This means that any device which attempts to harness the kinetic energy and possible advantages based on these principles will continue to be sub-optimal.

DISCLOSURE OF INVENTION

The present invention is a combination of three interconnected gyroscopic ring-like rotating masses, with each of the three ring-like masses being configured to rotate in various planes, depending on the desired orientation. Regardless of the orientation of the three rings, each of the three interconnected rotating masses will share substantially the same center of gravity and generate a separate yet interactive kinetic energy and angular momentum in each of the three planes, thereby providing resistance to rotational forces from external sources. This is known as "equal force presence." Additionally, a series of pedestal supports for supporting the three ring-like masses is disclosed.

BRIEF DESCRIPTION OF DRAWINGS

The preferred embodiments of the present invention will hereinafter be described in conjunction with the appended drawings, wherein like designations denote like elements, and.

BEST MODE FOR CARRYING OUT THE INVENTION

1. Overview

Figure 1:
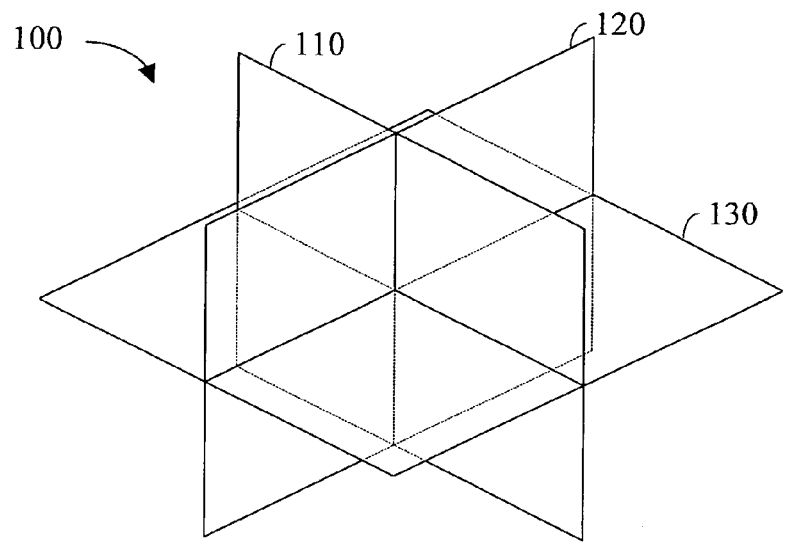
FIG. 1 is a perspective view of the three planes for initial rotation of the three gyroscopic rings of a gyroscopic propulsion apparatus according to a preferred embodiment of the present invention.

The following information provides a basis for understanding of the principles underlying the operational elements of the invention, specifically the forces associated with spinning masses of ring geometry and the magnetic basis for brushless motors, including the use of Hall Effect sensors. Those skilled in the art may proceed directly to the detailed description of the invention below.

Forces Associated With Ring Geometry

In assessing the patterns of angular motion that best reveal the influence of the cosmic environment the following consideration is apparent. In the formulas defining rotational inertia, the formula for an ideal ring ($I=MR^2$) is mathematically superior for the purpose of maximizing the ratio of angular momentum to the mass, more so than for any other single shape. This mathematical relationship is most ideal when the ring is as thin as possible, when all of the mass is equally far from the center of rotation. But the practical application of this principle requires that the ring have some thickness. The formula to accommodate the thickness factor of a ring is $I=M/2(R_1^2+R_2^2)$, where $R_1$ is the inside radius and $R_2$ is the outside radius. Additionally, the radius is typically constrained by manufacturing limitations and the cost of the materials.

Lorentz Devices

There are several sensors that use the Lorentz force, or Hall Effect, on charge carriers in a semiconductor. The Lorentz force equation describes the force $F_L$ experienced by a charged particle with charge q moving with velocity v in a magnetic field B:

$$F_L=q(v\times B)$$

Since $F_L$, v, and B are vector quantities, they have both magnitude and direction. The Lorentz force is proportional to the cross product between the vectors representing velocity and magnetic field; it is therefore perpendicular to both of them and, for a positively charged carrier, has the direction of advance of a right-handed screw rotated from the direction of v toward the direction of B. The acceleration caused by the Lorentz force is substantially perpendicular to the velocity of the charged particle; therefore, in the absence of any other forces, a charge carrier follows a curved path in a magnetic field.

The Hall Effect is a consequence of the Lorentz force in semiconductor materials. When a voltage is applied from one end of a slab of semiconductor material to the other, charge carriers begin to flow. If at the same time a magnetic field is applied perpendicular to the slab, the current carriers are deflected to the side by the Lorentz force. Charge builds up along the side until the resulting electrical field produces a force on the charged particle sufficient to counteract the Lorentz force. This voltage across the slab perpendicular to the applied voltage is called the Hall voltage.

Hall Effect Sensors

Hall Effect sensors typically use n-type silicon when cost is of primary importance and GaAs for higher temperature capability due to its larger band gap. In addition, InAs, InSb, and other semiconductor materials are gaining popularity due to their high carrier mobilities that result in greater sensitivity and frequency response capabilities above the 10-20 kHz typical of Si Hall sensors. Compatibility of the Hall sensor material with semiconductor substrates is important since Hall sensors are often used in integrated devices that include other semiconductor structures.

In most Hall sensors, charge carriers are deflected to the side and build up until they create a Hall voltage across the slab with a force equaling the Lorentz force on the charge carriers. At this point the charge carriers travel the length in approximately straight lines, and no additional charge builds up. Since the final charge carrier path is essentially along the applied electric field, the end-to-end resistance changes little with the magnetic field. When the Hall voltage is measured between electrodes placed at the middle of each side, the resulting differential voltage is proportional to the magnetic field perpendicular to the slab. It also changes sign when the sign of the magnetic field changes. The ratio of the Hall voltage to the input current is called the Hall resistance, and the ratio of the applied voltage to the input current is called the input resistance. The Hall resistance and Hall voltage increase linearly with applied field to several teslas (tens of kilogauss). The temperature dependence of the voltage and the input resistance is governed by the temperature dependence of the carrier mobility and that of the Hall coefficient. Different materials and different doping levels result in tradeoffs between sensitivity and temperature dependence.

2. Detailed Description

To use the principles of rotational energy and momentum as a mechanism of action, a device or machine needs to be created that embodies the application of the rotational energy and momentum. Accordingly, the present invention uses a brushless electric motor design built to spin a magnetically patterned ring like the rotor of a gyroscope to provide the desired mechanism for exploitation of the principles of angular energy and angular momentum in a gravitational field. The present invention employs three of these motors, positioned at right angles to each other to achieve stability in a specific frame of reference. The three rings are housed in a spherical container that is constructed from a non-metallic material.

Ring geometry of individual spinning masses is the basis to allow for the required association of three of these masses that are equal in their production of angular momentum and kinetic energy at the same angular velocities. The result of this association will allow for the mechanical control of the net rotational inertia of the revolving mass by the control of the individual rotating masses. These individual rotating ring masses are placed at 90-degree angles with respect to one another so that each individual ring mass will have force that affects the other rotating ring masses identically. The composite revolving mass will exhibit rotational inertia far in excess of the rotational inertia attributed to the mass when not in this precise motion association. This mechanically induced force of rotational inertia will manifest itself as a force to oppose the gravitational field surrounding the composite revolving mass when it reaches the threshold magnitude for the gravitational environment of its then current placement.

The mechanism used for the demonstration of this principle is based on a brushless electrical motor designed to produce large amounts of angular momentum in proportion to the mass of the motor. Three brushless motors of ring geometry are used to create the composite motor. Each of the three brushless motors is designed to produce the same amount of angular momentum and kinetic energy at the same angular velocity. This is accomplished by carefully selecting the material used to construct the rotor portion of the brushless motors.

These brushless motors are designed to be powerful gyroscopic actuators producing large amounts of stabilizing rotational force. Each individual ring rotor is a ring-like mass housed within a containment ring. The containment ring is used to contain and control the mechanical spin of the ring rotor and is also the housing for the electrical drive coils for the brushless motors. In general, it is desirable that the ring rotor be engineered to be as heavy and massive as possible and that the containment ring be as light and of minimal mass as is possible while structurally rigid enough to maintain the containment of the moving rotor. The ring rotor rides on the inside surfaces of the containment ring and is supported by a series of bearings and is driven around by a series of drive coils acting on permanent magnets mounted in the rotor. In the most preferred embodiment of the present invention, a series of 6 sets of bearings is driven around by 4 drive coils acting on 6 permanent magnets mounted in the rotor.

The apparatus is fundamentally an engine that includes three separate rotatable gyroscopic ring rotors, where each of the three gyroscopic ring rotors lies in a separate and distinct plane and in at least one preferred embodiment of the present invention, where each of the three planes is perpendicular to the other two planes (X, Y, and Z). Each of the gyroscopic ring rotors is capable of achieving substantially the same angular momentum at substantially the same angular velocity, as is each of the other two gyroscopic ring rotors. By simultaneously spinning each of the three gyroscopic ring rotors, the composite superstructure comprised of the three individual ring rotors resists rotation in any single direction. This is known as "equal force presence." Further, when the rate of rotation for the three spinning ring rotors reaches the appropriate level, the composite structure of the three associated rings resists any change in orientation from any external force, including the gravitational field of the earth or other bodies large enough to generate a significant gravitational field. Accordingly, as the earth spins about its axis, the mechanism moves in the only direction possible, which is up, or away from the center of mass for the body exerting the gravitational force. By adjusting the angular momentum of each of the rings relative to the other rings, or by adjusting the relative angle between the planes of rotation, altitudinal and directional changes of the apparatus can be achieved. Each of the three gyroscopic ring rotors housed within the containment ring may be called a "gyro actuator."

The stabilizing force exerted by each gyro actuator is positioned against the forces exerted by the associated gyro actuators, so that a motion feedback loop is created. This composite superstructure of angular momentum will exhibit a resistance to any force of torque from any direction, making for what can be called super-additive rotational inertia. The rotational inertia of this composite superstructure is related to the angular momentums of the individual gyro actuators. As long as the forces of the individual rotors are correctly matched and balanced against one another, an internal force of stabilization or equal force presence can be achieved. With a high enough level of angular momentum, this internal force will exceed any influence of external force in the surrounding environment; including the rotational torque associated with the force of gravity in a given gravitational field. Obviously, the greater the gravitational field, the greater the kinetic energy and angular momentum that will be required to overcome the gravitational forces associated with a given environment.

Since it is desirable to maximize angular momentum with respect to mass, the suspension system housing and containing the ring rotor, and acting as an electric stator magnetically inducing the revolving motion of the rotor, is constructed to be as lightweight as possible. The angular acceleration of the ring does not need to be more than the necessary amount to increase angular velocity and momentum and, eventually, reach the desired level. This rate of increase can be gradual, and time can be given for this force to accumulate.

The energy put into the system is converted into the kinetic energy of rotation, minus any loss of energy as heat due to frictional resistance. The amount of energy that can be stored within the system without large losses due to the frictional resistance of rotation and precessional motion depends at least in part on the perfection of the gyro design and construction. If sufficiently perfect, the generation of tremendous amounts of kinetic energy can be accumulated in the form of angular momentum. The degree of the precision of the perfection of this component, thereby minimizing frictional resistance, is a factor in determining its efficiency and effectiveness as a gyro actuator.

If the angular momentum is sufficient, and the containment and suspension system is sufficiently lightweight and free to move, only being anchored at one point to prevent the backspin of this containment ring, the rotor ring will carry the containment ring with it, duplicating any of its secondary angular displacement. And, like a heavy pendulum or a gyro compass, it will maintain its cosmic orientation in space adjusting to a point of maximum stability until harmony with the spinning earth and the cosmic environment is achieved. The final orientation of a free and unrestrained spinning ring gyro is with its axis of rotation approximately parallel to the earth's axis except that it will be spinning in the opposite or complementary direction.

The velocity of rotation and the rotational inertia are the factors that determine the magnitude of the force of the angular momentum of the ring rotor and can be calculated, after accounting for factors such as friction and the inertia of the containment ring as retarding factors of generated force, which will negatively impact the overall performance of the system.

The spin of a ring with minimum frictional resistance to rotation, once stabilized with respect to gravity, if free to move in any direction, will, at a rate proportional to its ratio of angular momentum with respect to mass, continue to adjust with respect to the environment until the point of maximum stabilization is reached on a continuing basis. This position of maximum stabilization is oriented so that the axis of the spinning gyro is approximately parallel to the axis of the spinning earth, yet spinning in the opposite or complementary direction. Thus, the action of a ring gyro actuator with sufficient magnitude of angular momentum will exhibit a predilection to orient itself into a definitive position with respect to the cosmic environment in order to attain optimum stabilization with a substantial force.

Ring gyroscopes of differing dimensions can be manufactured such that they will be equal in the amount of angular force each will produce at the same angular velocity. This can be accomplished by carefully selecting the materials that are used for the rotors of each of the three brushless motors. The basic force of angular momentum can be calculated for different sizes of rotating ring rotors made from different materials. By measuring the forces of two different sized ring gyroscopes, including their containment and stator masses, the technique of interpolation can be used to create three concentric ring gyroscopes that are substantially equal in respect to the force of their respective angular momentums and kinetic energies. Except for the dimension from the center of rotation, these ring-like gyroscopes will have substantially identical force attributes.

Given that ring gyroscopes can be made in different sizes, it is desirable to balance the density of the rotors, so that each of the different sized ring gyroscopes will exhibit, to the extent practical, substantially the same angular momentum while revolving at substantially the same angular velocity. Arranging three concentric ring gyro actuators, though different in size, being substantially equal in force, into a composite system in which each of the rings are inclined ninety degrees with respect to one another and joined into this position by a containment system creates the fundamental propulsion system of the present invention.

With the existence of these individual ring-like gyroscope actuators, the primary component exists from which a concentric ring gyroscope superstructure can be built. In one preferred embodiment of the present invention, the containment rings in the superstructure, at ninety degree angles to one another, are locked into place with respect to each other, roughly forming a sphere shaped cage in which the forces of action on the containment rings are distributed around the periphery of the spherical cage in substantially equal and symmetrical manner with respect to the effects of the associated revolving forces.

This superstructure is then placed in a final light, hollow, and thin, yet strong sphere. This composite structure will resist torque from any and all directions equally, so long as the individual forces of each component ring are equal and balanced with respect to one another. The increase in the force of angular momentum of each individual component increases the resistance of the superstructure to any outside torque, including the overall frame of gravitational forces associated with the earth and other masses. The composite superstructure of concentric ring gyroscope actuators exhibits the super-additive force of maximum rotational inertia.

Knowing that the composite superstructure will resist torque from any direction is only one consideration of the result of this composite motion. The three individual gyroscopes, placed in an orientation such that each is offset by ninety degrees to one another in a composite superstructure, cannot all be simultaneously in maximum equilibrium with respect to any cosmic environment that is held by the force of gravity, in an angular revolution, as is the case on the surface of a planet like the earth. When in such an environment, each of the three individual gyros will continue to exert their individual influences of action toward maximum stabilization, but all the while the composite superstructure will not be able to absorb any precessional adjustments. Any single gyro actuator, by precessing to adjust to the force of torque will, of necessity, cause the other two gyro actuators to require this same adjustment, doubling the problem within the composite system, thus creating a motion feedback loop that has no resolution within the system.

Only by being insulated by sufficient distance from the influence of gravity in the cosmic environment will the composite superstructure of interlocked gyroscopes find equilibrium. The superior resistance to torque will direct this system of motion to the environment, which is the freest from torque exerted by the gravitational forces inherent in a typical gravitational field. The degree of the magnitude of this composite force of resistance to torque is mechanically connected to, and dependent on, the individual force of each component gyroscope. Gravity is overcome when enough energy is generated by the system that the resistance to torque reaches a threshold resulting in a force of displacement in the direction where least external force, manifesting as torque, exists. And this direction is generally away from any and all gravitational sources, including planets and other bodies of mass located within the universe.

The mass, shape, and speed of rotation are factors in the measurement of angular momentum, but shape and mass are the only significant factors in determining rotational inertia. This is true except in the special circumstance when the mass is spinning and angular momentum itself resists any secondary force of torque or tumble against the primary angle of rotation. Any secondary tumbling force is distributed about the periphery of the spinning object as precessional motion that will slow the primary velocity of rotation until a final balance of a single axis of rotation is achieved. This super-additive effect of increased rotational inertia of the mass in every direction except the one of primary rotation underscores the fact that an object rotating resists tumbling; there can be only one axis of rotation.

This composite superstructure of angular momentum will exhibit a resistance to any force of torque from any direction, making for what can be called "super-additive rotational inertia." The rotational inertia of this composite superstructure is proportional to the angular momentum of the individual spinning rings. As long as the forces of the rotors are balanced against one another, a tremendous internal force of stabilization is accumulated. This internal force can exceed the angular influence of external forces in the immediate surrounding environment. This includes even the force of gravity, which generally requires torque as an integral component in achieving its result.

Referring now to FIG. 1, the three different planes of initial rotation for a gyroscopic propulsion device according to a preferred embodiment of the present invention are shown. As shown in FIG. 1, a first plane 110 is perpendicular to a second plane 120 and to a third plane 130. Similarly, second plane 120 is perpendicular to third plane 130. Thus, each of the three planes of rotation is perpendicular to the other two planes of rotation. For the purposes of the present invention, each of the three gyroscopes will provide a ring-like rotating mass in one of these planes.

Figure 2:
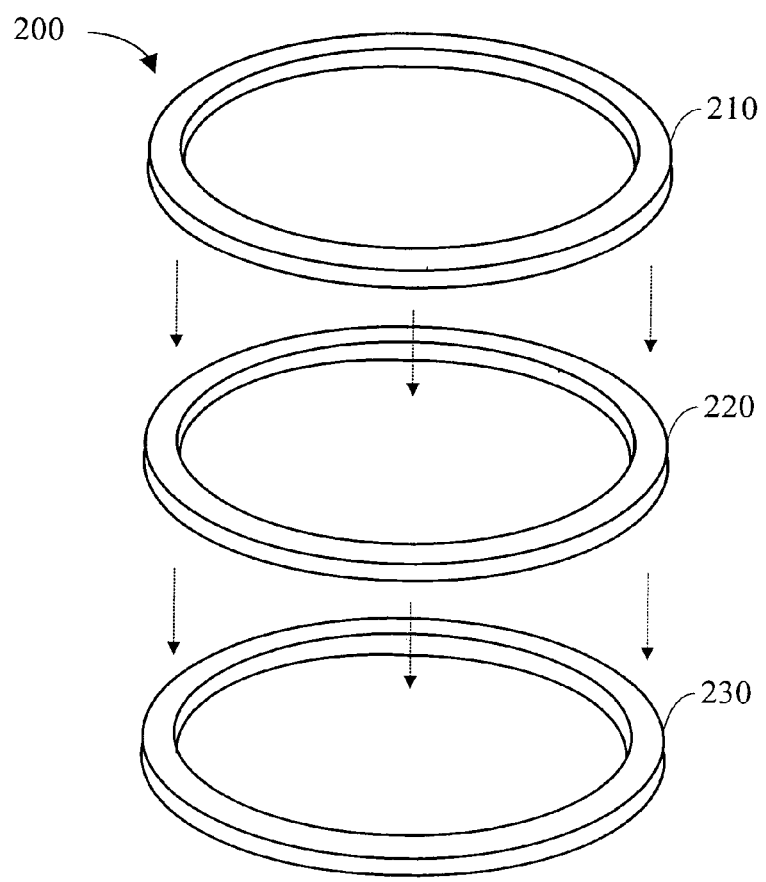
FIG. 2 is an exploded view of the three main components in a single gyroscopic ring used in a gyroscopic propulsion apparatus in accordance with a preferred embodiment of the present invention.

Referring now to FIG. 2, an exploded view of the basic components of a gyroscopic ring 200 in accordance with a preferred embodiment of the present invention is shown. As shown in FIG. 2, gyroscopic ring 200 includes an upper half-shell 210, a rotor element 220, and a lower half-shell 230. Upper half-shell 210 and lower half-shell 230 form a container for rotor element 220 and are most preferably constructed from a high-strength, durable, non-metallic, light-weight material such as Vespel® made by Dupont®. Upper half-shell 210 and lower half-shell 230 are ring-shaped shell elements which are joined together and form a containment ring or housing for rotor element 220. Rotor element 220 is a spinning ring-shaped mass and is most preferably constructed from durable metals such as titanium, stainless steel, etc. The specific materials used in manufacturing rotor elements 220 are described in greater detail in appendix A to this specification. The specific design of the internal surfaces of the upper half-shell 210 and lower half-shell 230 are described in greater detail in FIG. 20.

Rotor 220 is carefully machined such that the inner and outer diameter of rotor 220 is slightly smaller than the inner diameter of upper half-shell 210 and lower half-shell 230. Additionally, the overall thickness of rotor 220 is slightly less than the interior space provided within the housing formed by upper half-shell 210 and lower half-shell 230. This allows rotor 220 to rotate rapidly yet freely within the housing formed by the union of upper half-shell 210 and lower half-shell 230. Since rotor 220 will be rotating or spinning at a high rate, it is desired that all of the components be durable and of high-quality workmanship. Further detail regarding the manufacture of rotor 220, upper half-shell 210, and lower half-shell 230 is described in conjunction with FIG. 5.

Figure 3:
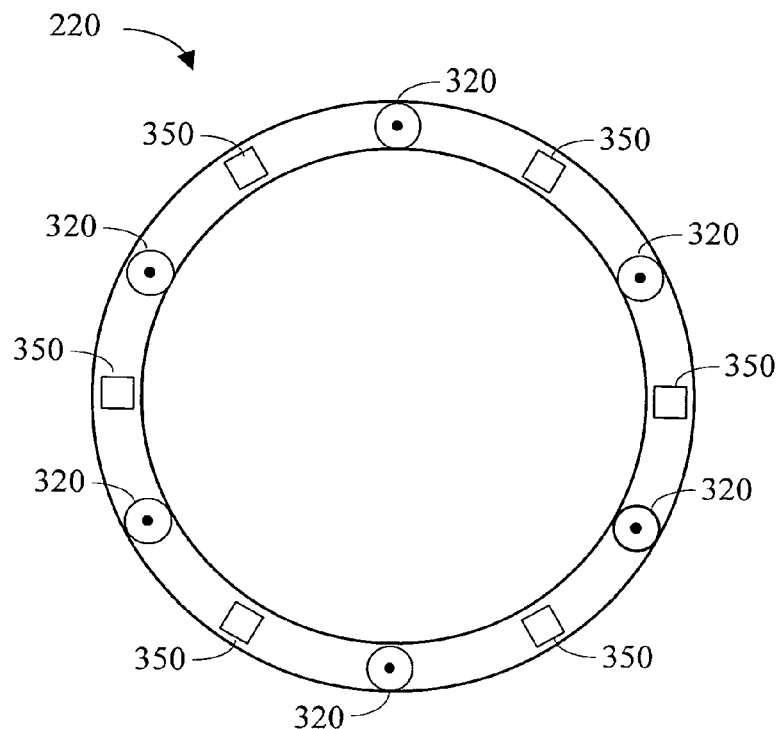
FIG. 3 is a plan view of the surface of the rotor for one of the three gyroscopic rings of a gyroscopic propulsion apparatus in accordance with a preferred embodiment of the present invention.
Figure 4:
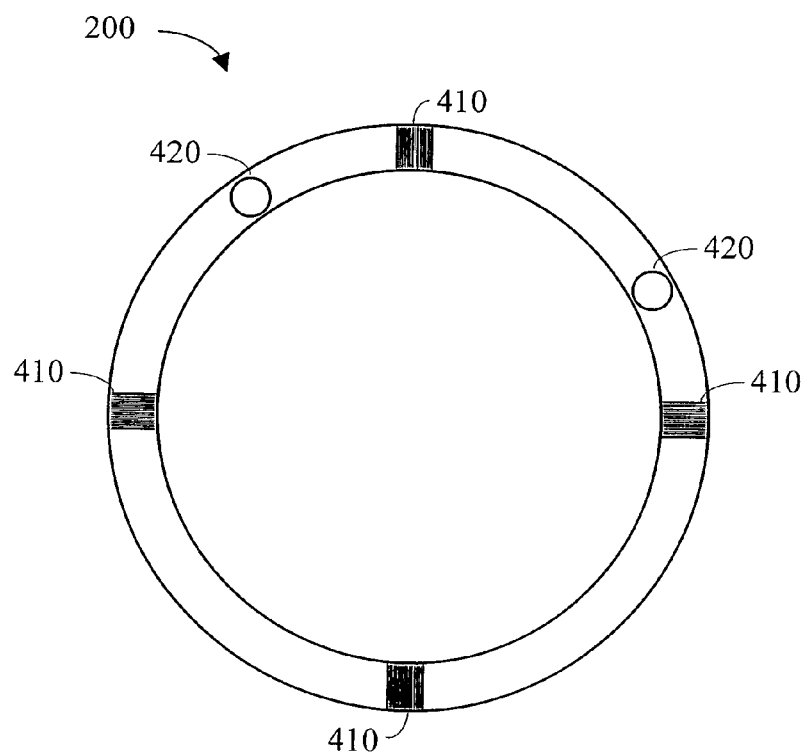
FIG. 4 is a plan view of the external housing for the rotor portion of the ring of FIG. 3.

Referring now to FIGS. 3 and 4, a representative gyroscopic ring 200 is shown. In order to construct a gyroscopic propulsion device in accordance with the preferred embodiments of the present invention, three gyroscopic rings 200 will be needed, with each of the three rings having the same density. FIG. 3 depicts the general physical nature of the various components of a representative rotor element 220 of a representative gyroscopic ring 200 and FIG. 4 depicts the exterior housing of a representative gyroscopic ring 200 with a series of copper windings 410. In the preferred embodiments of the present invention, gyroscopic ring 220 serves as the rotor of a brushless motor. Rotor element 220 includes a series of bearings 320 and a series of magnets 350.

As shown in FIG. 3, each set of bearings 320 are spaced equidistant around the circumference of gyroscopic ring 220. Similarly, magnets 350 are also spaced equidistant around the circumference of gyroscopic ring 220. In the preferred embodiments of the present invention, there are an equal number of bearings 320 and magnets 350 embedded into the body of gyroscopic ring 220. In the most preferred embodiment of the present invention, the number of bearings 320 is six and the number of magnets 350 is also six.

Magnets 350 are embedded into the body of rotor element 220 so as to interoperate with copper windings 410 and create the drive mechanism for the brushless motor that propels rotor element 220 within the housing of gyroscopic ring 200. Magnets 350 are neo-dimium ferrous boron magnets. Magnets 350 are high-grade magnets generating a magnetic force of approximately 4,800 gauss each. Magnets 350 are electrically connected in sets, with each set being connected in parallel.

Bearings 320 are recessed into the body of rotor element 220 and serve to minimize the amount of surface contact area between rotor element 220 and the housing of gyroscopic ring 200. In the most preferred embodiments of the present invention, bearings 320 are high-grade gyro bearings manufactured from non-magnetic stainless steel. This allows rotor element 220 to rotate rapidly with the housing of gyroscopic ring 200 with a minimal amount of loss due to friction. Bearings 320 are most preferably constructed from high quality stainless steel and to be as resistive to friction as possible.

Although the design of each of the gyroscopic rings 200 used in the gyroscopic propulsion device is similar in nature, the density of the material used in the construction of each of the rotor elements 220 for each of the gyroscopic rings 200 is different. The different densities of the materials will allow the overall density of each of the rings to be equal since the interconnected nature of the rings dictates that each of the three rings has a different diameter. In at least one preferred embodiment of the present invention, the three rings are associated such that each of the three rings is capable of being positioned at 90° relative to the other two rings. In another preferred embodiment of the present invention, the three rings are capable of rotating around an axis and being repositioned relative to the other rings, including one orientation where all three rings lie in substantially the same plane.

The size and densities of the three rings are designed such that each of the three gyroscopic rings achieves the same angular momentum at the same angular velocity. This careful balancing of gyroscopic rings 200 allows the gyroscopic propulsion device to achieve a remarkable stability that resists any outside force of movement. Detailed specifications for each of the three gyroscopic rings are contained in appendix A to this application.

Referring now to FIG. 4, a plan view depicting the exterior of a representative gyroscopic ring 200 according to a preferred embodiment of the present invention is shown. The exterior includes copper windings 410 and Hall Effect sensors 420. In the most preferred embodiment of the present invention, the number of copper windings 410 is four. Each of the four copper windings 410 is a comprised of a series of windings of copper wire made around the body of gyroscopic ring 200 at points spaced 90° apart. Copper windings 410 cooperate with magnets 350 to provide the propulsion for rotor element 220 within the housing of gyroscopic ring 200 in a manner consistent with typical operation of a brushless motor. Additionally, copper windings 410 serve to hold upper half-shell 210 and lower half-shell 230 together.

In the most preferred embodiments of the present invention, each copper winding 410 is made using "turns" of approximately 28 gauge copper wire. In the most preferred embodiments of the present invention, each copper winding 410 is approximately 1.25 inches for each layer of copper winding 410. Approximately 14 layers of copper are wound around the body of gyroscopic ring 200. It is desirable to keep the weight of copper windings 410 to a minimum yet have enough copper to create thrust sufficient to efficiently spin rotor element 220 within the body created by upper half-shell 210 and lower half-shell 230.

Copper windings 410 operate in pairs for a single circuit and each of a pair of copper windings 410 that are located opposite each other form a single circuit. Accordingly, there are two circuits for the arrangement shown in FIG. 4. Additionally, each of the pairs of copper windings 410 for each of the two circuits operates in conjunction with a single Hall Effect sensor 420 to determine the location of magnets 350, thereby allowing the effective operation of the brushless motor.

Hall Effect sensors 420 are used to sense the position of magnets 350 as part of a feedback loop, which is used to control the rate of angular velocity for the gyroscopic rings. The use of Hall Effect sensors 420 in the overall control of the circuit is explained in greater detail in conjunction with FIG. 8. Connected to copper windings 410 and Hall Effect sensors 420 are a set of control wires. The control wires provide a means for transmitting control signals to and from superstructure 700 in order to cause the rotors for each of the ring-like gyroscopes to rotate.

Figure 5:
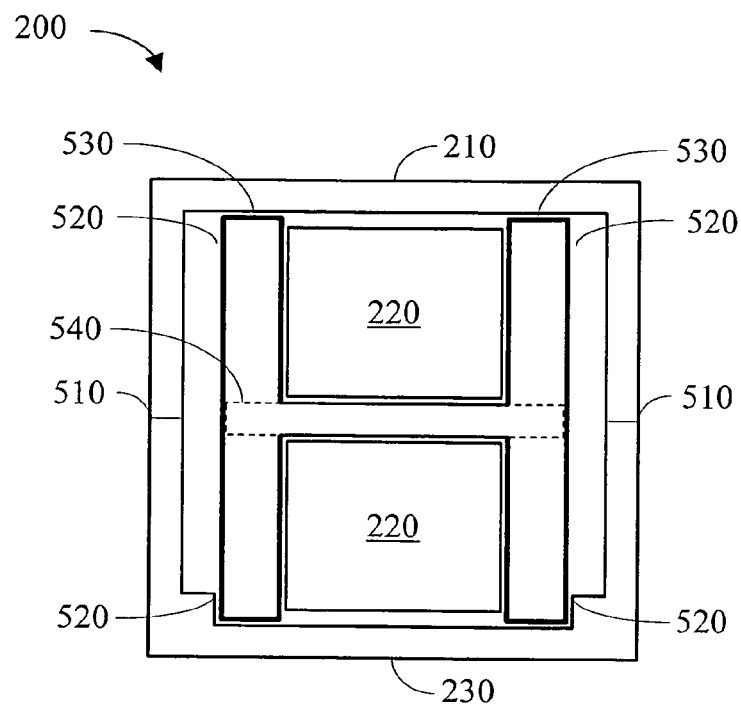
FIG. 5 is a sectional view of a portion of the bearing assembly of the rotor portion of the gyroscopic ring of FIG. 3.

Referring now to FIG. 5, a cross-sectional view of the interior of a representative gyroscopic ring 200 is shown. The housing of gyroscopic ring 200 is comprised of upper half-shell 210 and lower half-shell 230, joined at seam 510. A series of interior step portions 520 serve to contain the lateral movement of rotor element 220 within the housing of gyroscopic ring 200 as it rotates about its axis of rotation. Similarly, upper half-shell 210 and lower half-shell 230 cooperate to constrain the vertical movement of rotor element 220 within the housing of gyroscopic ring 200 as it rotates about its axis of rotation. Each bearing 320 comprises a pair of wheels 530 joined together by an axle 540. Axle 540 is inserted through an opening formed in the body of rotor element 220. The diameter of wheels 530 is slightly larger than the thickness of rotor element 220, thereby preventing rotor element 220 from contacting the housing of gyroscopic ring 200 as it rotates about its axis of rotation. When fixed in place, bearings wheels 530 are the only point of contact with the housing of gyroscopic ring 200 as rotor element 220 rotates about its axis of rotation.

Figure 6:
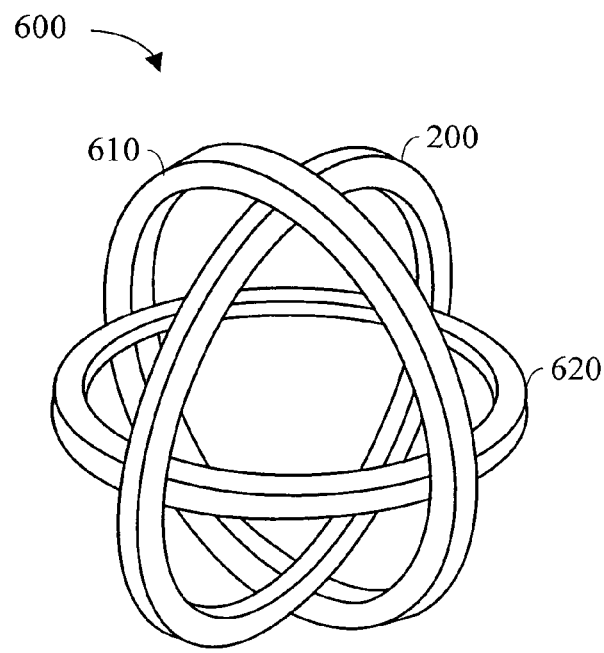
FIG. 6 is a perspective view of a superstructure created from three gyroscopic rings in accordance with a preferred embodiment of the present invention.

Referring now to FIG. 6, a perspective view of a main superstructure 600 for a gyroscopic propulsion device in accordance with a preferred embodiment of the present invention is shown. Superstructure 600 is comprised of gyroscopic ring 200, gyroscopic ring 610, and gyroscopic ring 620. Each of the three gyroscopic rings contains a rotor that rotates within each of the gyroscopic rings. Each of the three gyroscopic rings is fixed in position so that its axis of rotation for the spinning mass housed within each of the three gyroscopic rings lies in a plane, which is perpendicular to the plane that defines the axis of rotation for each of the other two spinning masses housed within the other gyroscopic ring containment shells.

The outer diameter of gyroscopic ring 620 is less than the inner diameter of gyroscopic ring 200 and the outer diameter of gyroscopic ring 200 is less than the inner diameter of gyroscopic ring 610. This allows gyroscopic ring 620, gyroscopic ring 200 and gyroscopic ring 610 to "nest" inside of each other, creating a cage-like sphere structure.

In order to achieve propulsion, each of gyroscopic rings 620, 200, and 610 is energized by the combination of their respective magnets and windings (not shown) to start the rotor element contained within each respective gyroscopic ring spinning. The actual length of time required to "spin up" the rings is not as important as the gyroscopic rings achieving the same angular velocity and the same angular momentum. In addition, as long as the masses housed within the gyroscopic rings are spinning at the same angular velocity, each of the gyroscopic rings will also maintain an equal kinetic energy. This equates to equal "force presence."

In the most preferred embodiment of the present invention, gyroscopic ring 610 is constructed from a titanium metal having a density of 4.420 g/cc, gyroscopic ring 200 is constructed from stainless steel metal having a density of 7.886 g/cc, and gyroscopic ring 620 is constructed from tungsten nickel alloy metal having a density of 17.000 g/cc.

Depending on the circumference of the gyroscopic rings, the mass of the respective rotor elements, and the angular velocity of the gyroscopic rings, superstructure 600 will reach a point of internal stabilization that will resist all outside forces, including the force of gravity. At this point, any increase in the angular velocity of the gyroscopic rings causes superstructure 600 to resist the rotational torque of the earth and seek an internal equilibrium that cannot be reached in its present location with respect to the gravitational field of the earth, or other body of mass large enough to create any type of significant gravitational field. Accordingly, superstructure 600 will need to move to a new location where the forces of internal stabilization can be maintained. This will cause superstructure 600 to move away from the earth to a distance where the internal stabilization can be maintained. The distance moved will be related to the angular momentum of the spinning masses.

The greater the angular momentum of the spinning masses, the greater the distance superstructure 600 will need to move. Similarly, by reducing the angular velocity of the rings, superstructure 600 will begin to move back towards the earth because the internal stabilization can be maintained within a smaller distance.

Similarly, movement in directions other than directly away from the earth can be achieved by varying the angular velocity of one or more of the gyroscopic rings to create an imbalance in the angular velocities of the gyroscopic rings and/or by changing the orientation of the gyroscopic rings with respect to one another.

Figure 7:
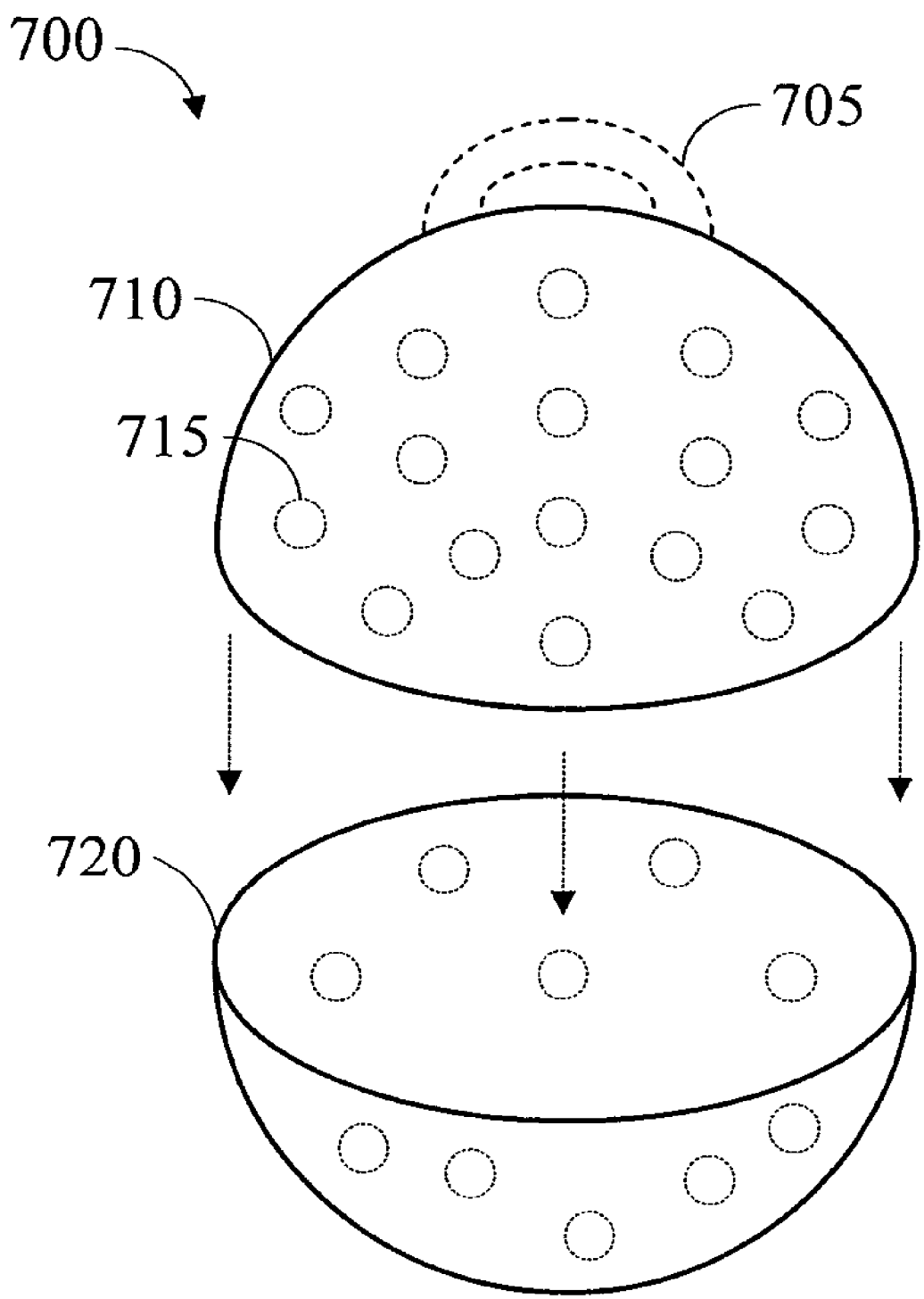
FIG. 7 is a perspective view of a housing for the three gyroscopic rings in accordance with a preferred embodiment of the present invention.

Referring now to FIG. 7, a perspective view of a housing 700 for containing superstructure 600 in accordance with a preferred embodiment of the present invention is shown. Housing 700 consists of an optional handle 705, an upper housing 710 and a lower housing 720. Upper housing 710 and lower housing 720 contain superstructure 600 and may be joined together in any suitable fashion by using such techniques as screw-threaded bodies with a threaded collar that securely joins upper housing 710 to lower housing 720. Other methods of joining upper housing 710 to lower housing 720 may include fabricating the edges of upper housing 710 and lower housing 720 with interlocking or "snap-fit" connectors or latches. One or more optional handles 705 may be attached to housing 700 in certain preferred embodiments.

Preferably, housing 700 is constructed of a durable, non-metallic material such as high-strength plastic or some other similar material. Additionally, as shown in FIG. 7, housing 700 may contain optional apertures 715, which are openings in upper housing 710, and/or lower housing 720 that allow heat to escape the interior of housing 700. Given that the rotors contained with superstructure 600 may be spinning rapidly, thereby generating heat, it is desirable to provide a way for the heat generated by the spinning masses to escape the interior of housing 700.

Superstructure 600 may be fixed in position within the interior of housing 700 by using a series of molded posts, containment ridges, or other means sufficient to contain superstructure 600 in place within the interior of housing 700. Once placed within housing 700, one or more gyroscopic propulsion device can be attached to other objects and the propulsion generated by the gyroscopic propulsion device can be used to move objects from one place to another. This would allow the gyroscopic propulsion device(s) to be used as a propulsion apparatus or engine for a vehicle in applications such as transporting people and goods from place to place.

Figure 8:
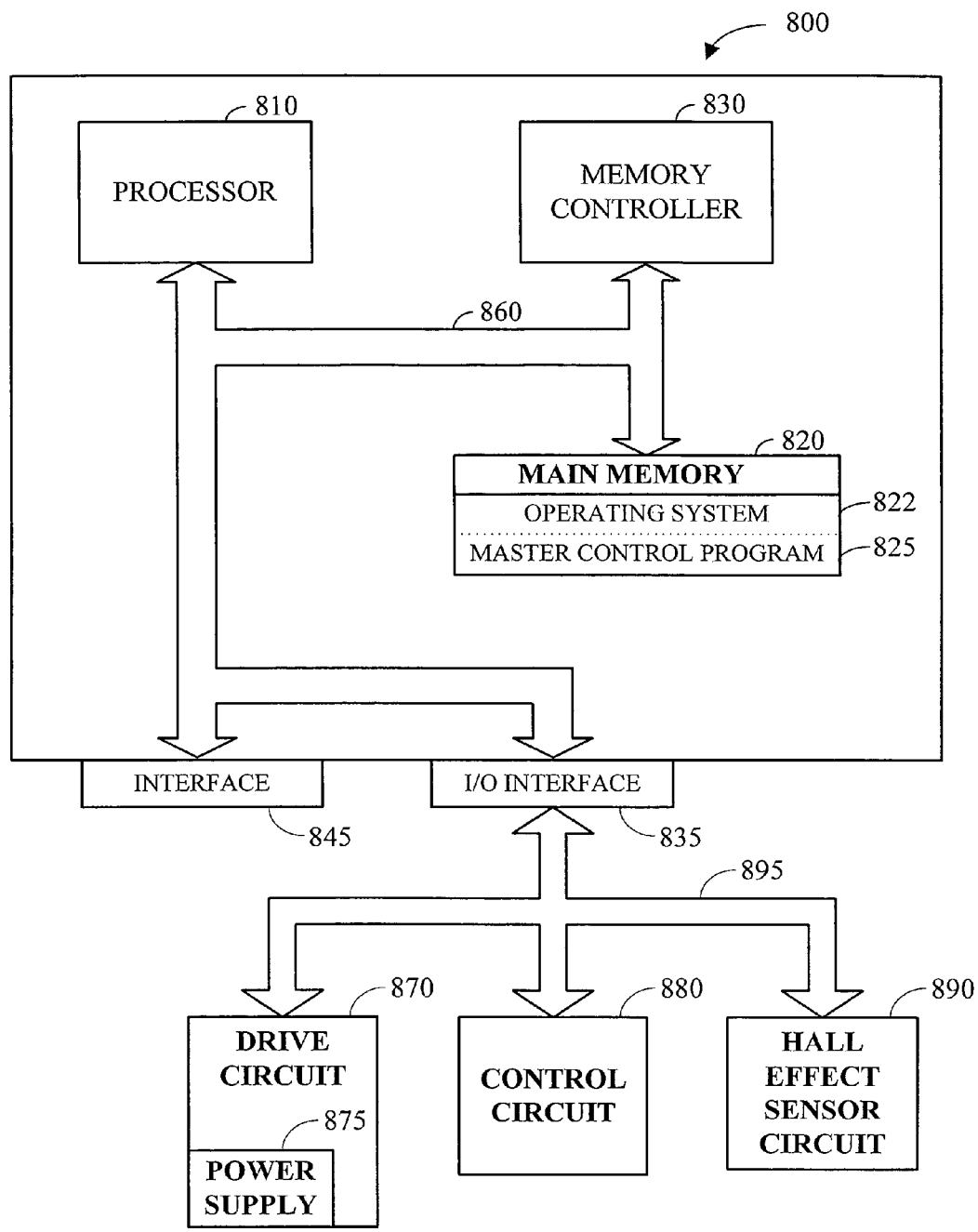
FIG. 8 is a block diagram of the control circuits for a gyroscopic propulsion apparatus in accordance with a preferred embodiment of the present invention.

Referring now to FIG. 8, a block diagram of a control system 800 for a gyroscopic propulsion apparatus according to a preferred embodiment of the present invention is shown. As shown in FIG. 8, control system 800 incorporates a computer 805; an I/O interface 835; an interface 845; a bus 895; a drive circuit 870; a control circuit 880; and a Hall Effect sensor circuit 890. As those skilled in the art will appreciate, the methods and apparatus of the present invention apply equally to any computer system and combination of circuit components. Specifically, it is envisioned that a hand-held computer or palm-computing device may perform all or substantially all of the functions described in conjunction with computer 805.

Alternatively, control system 800 may be implemented with a Field Programmable Gate Array (FPGA), digital control circuitry, or other type of circuit mechanism. Regardless of the specific implementation, it is desirable that there be some mechanism provided whereby the rate of rotation and angular relationship of the three ring-like gyroscopes can be controlled. In some applications, control system 800 may be contained within housing 700 and the various control signals necessary to control superstructure 600 may be transmitted to and from control system 800 from an external source via wireless communication means.

Computer 805 suitably comprises at least one Central Processing Unit (CPU) or processor 810, a main memory 820, a memory controller 830, and an I/O interface 835, all of which are interconnected via a system bus 860. Note that various modifications, additions, or deletions may be made to control system 800 and computer 805 as illustrated in FIG. 8 within the scope of the present invention such as the addition of cache memory or other peripheral devices. For example, computer 805 may also include a monitor or other display device (not shown) connected to the system bus 860. Alternatively, it is anticipated that computer 805 may be a terminal without a CPU that is connected to a network as a network computer (NC). In that case, the responsibilities and functions of CPU 810 will be assumed and performed by some other device on the network. FIG. 8 is not an exhaustive illustration of any specific control system, computer system or configuration, but is presented to simply illustrate some of the salient features of one preferred embodiment for control system 800.

Processor 810 performs the computation and control functions of computer 805, and may comprise a single integrated circuit, such as a microprocessor, or may comprise any suitable number of integrated circuit devices and/or circuit boards working in cooperation to accomplish the functions of a processor. Processor 810 typically executes and operates under the control of an operating system 822 within main memory 820.

I/O interface 835 allows computer 805 to store and retrieve information from drive circuit 870, control circuit 880, and Hall Effect sensor circuit 890 via bus 895. It is important to note that while the present invention has been (and will continue to be) to include a fully functional computer system, those skilled in the art will appreciate that the various mechanisms of the present invention are capable of being distributed as a program product in a variety of forms, and that the present invention applies equally regardless of the particular type or location of signal to control the apparatus. I/O interface 835 may be a single bus or multiple computer bus structures. Additionally, I/O interface 835 may communicate via serial or parallel presentation of the data using any type of communication protocol and physical connection, including RS-232, Universal Serial Bus (USB) or any other standard connection means known or developed by those skilled in the art.

Interface 845 is a connection interface for connecting keyboards, monitors, trackballs and other types of peripheral devices to computer 805. Although shown as a single interface, interface 845 may actually be a combination of interface connections, each with a separate connection to bus 860.

Memory controller 830, through use of a processor (not shown) separate from processor 810, is responsible for moving requested information from main memory 820 and/or through I/O interface 835 to processor 810. While memory controller 830 is shown as a separate entity, those skilled in the art understand that portions of the function provided by memory controller 830 may actually reside in the circuitry associated with processor 810, main memory 820, and/or I/O interface 835.

Although computer 805 depicted in FIG. 8 contains only a single main processor 810 and a single system bus 860, it should be understood that the present invention applies equally to computer systems having multiple processors and multiple system buses. Similarly, although the system bus 860 of the preferred embodiment is a typical hardwired, multi-drop bus, any connection means that supports bidirectional communication in a computer-related environment could be used, including wireless communication means.

Main memory 820 suitably contains an operating system 822 and a master control program 825. The term "memory" as used herein refers to any storage location in the virtual memory space of computer 805. It should be understood that main memory 820 would not necessarily contain all parts of all mechanisms shown. For example, portions of operating system 822 may be loaded into an instruction cache (not shown) for processor 810 to execute, while other related files may well be stored on magnetic or optical disk storage devices (not shown). In addition, although shown as a single memory structure, it is to be understood that main memory 820 may consist of multiple disparate memory locations.

Operating system 822 includes the software, which is used to operate and control computer 805. Operating system 822 is typically executed by processor 810. Operating system 822 may be a single program or, alternatively, a collection of multiple programs, which act in concert to perform the functions of any typical operating system, which functions are well known to those skilled in the art.

Master control program 825 is the overall control program for control system 800. Master control program 825 communicates with drive circuit 870, control circuit 880 and Hall Effect sensor circuit 890 via bus 860 and bus 895. Master control program 825 is capable of interpreting the various signals received from I/O interface 835 and translating the signals in order to operate a gyroscopic propulsion apparatus. Master control program 825 further incorporates a user interface, which allows an operator to send instructions via bus 895, thereby controlling the operation of a gyroscopic propulsion device. The user may interact with master control program 825 by use of a video display terminal and keyboard (not shown), which are connected via interface 845.

Bus 895 is any communication path or medium used to transmit signals and provide communication between computer 805, drive circuit 870, control circuit 880 and Hall Effect sensor circuit 890. This includes standard serial and parallel bus structures, regardless of the physical topology of the communication path or physical medium used. In at least one preferred embodiment of the present invention, bus 895 is a wireless communication signal.

Drive circuit 870 contains a power supply 875 which is physically connected to coils 410 and is used to deliver approximately 2-8 amps at 90-180 volts to coils 410, thereby causing rotors 220 to rotate within the housing of gyroscopic rings 200. Those skilled in the art will understand that the operation of drive circuit 870 to control the rate of rotation for rotors 220 is similar to the operation of a standard brushless motor. Drive circuit 870 delivers the precise amount of electricity to coils 410 at precisely the right time.

Control circuit 880 is a timing circuit that is used to calculate the speed of rotors 220 and communicates with drive circuit 870 to control the timing for operating the gyroscopic propulsion apparatus.

Hall Effect sensor circuit 890 relays information from Hall Effect sensors 420 and is used to locate the position of magnets 350 with respect to coils 410 as rotor 220 rotates. The location of magnets 350 is sent to master control program 825 for additional processing. This allows master control program 825 to send signals to control circuit 880 and control circuit 880 will communicate with drive circuit 870 which will energize coils 410 in the appropriate sequence at the appropriate time to each drive rotor 220, thereby creating the angular momentum of superstructure 600. While the controls are shown as separate circuits, drive circuit 870, control circuit 880, and hall effect sensor circuit 890 may be combined into a single circuit and integrated with a computer 805 for certain applications.

Figure 9:
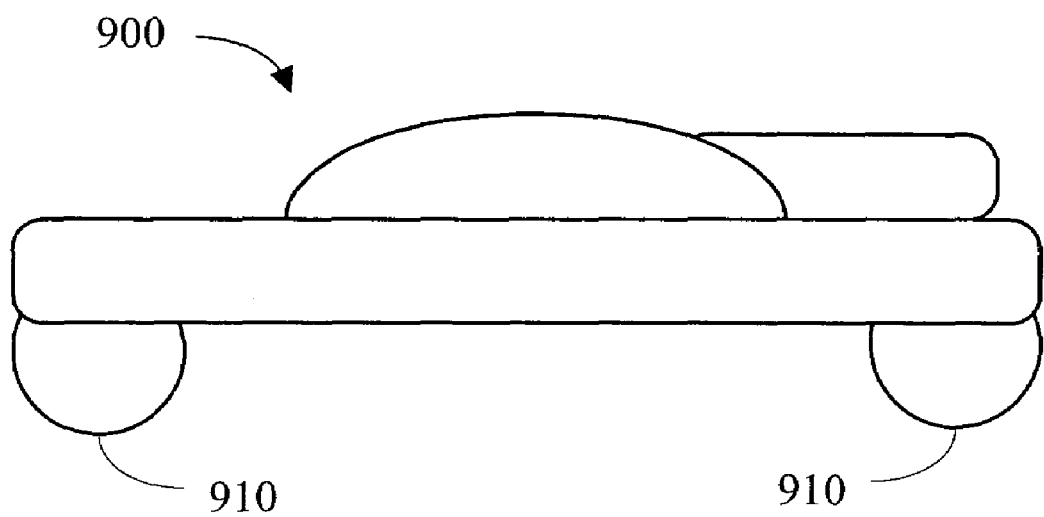
FIG. 9 is a perspective view of a vehicle incorporating a gyroscopic propulsion apparatus in accordance with a preferred embodiment of the present invention.

Referring now to FIG. 9, a perspective view of a vehicle 900 incorporating the gyroscopic propulsion apparatus in accordance with a preferred embodiment of the present invention is shown. Vehicle 900 is merely representative of any type of vehicle known to those skilled in the art and may take the shape or form thereof. Vehicle 900 will preferably have one or more gyroscopic propulsion units 910. Most preferably, Vehicle 900 will have at least two gyroscopic propulsion units 910, where each gyroscopic propulsion unit 910 is configured and controlled as described in conjunction with FIGS. 1-8.

The present invention provides several different methods for fixing the position of rings 200, 610, and 620 of FIG. 6 relative to the other. One such preferred embodiment of the present invention, using a series of interlocking components to create a support pedestal for rings 200, 610, and 620, is described in conjunction with FIGS. 10-22.

Figure 10:
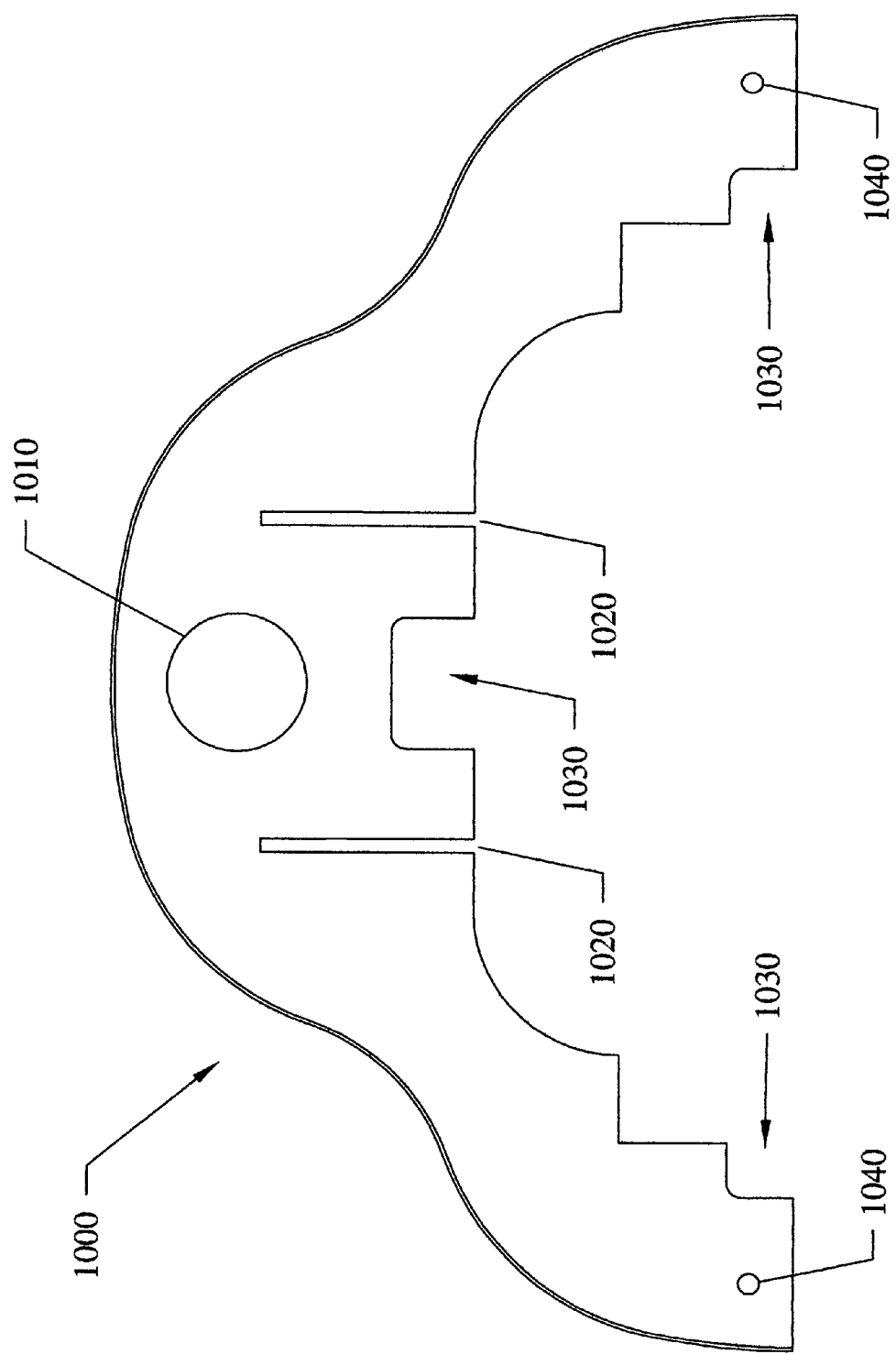
FIG. 10 is a top view of a z-plane pedestal component in accordance with a preferred embodiment of the present invention.

Referring now to FIG. 10, a top view of a z-plane pedestal component 1000 in accordance with a preferred embodiment of the present invention comprises: one or more optional cooling apertures 1010; assembly slots 1020; ring guides 1030; and connection apertures 1040. Z-plane pedestal component 1000 is one component used in conjunction with other similar components to create a support pedestal. Z-plane 1000 is preferably manufactured from a lightweight rigid material such as heavy-duty plastics or ceramics. The material should be relatively resistant to the effects of heat. One such suitable material is Vespel® manufactured by Dupont®.

Optional cooling aperture 1010 provides for heat dissipation during operation of the preferred embodiments of the present invention. Assembly slots 1020 are provided to allow the various pedestal components to fit together. Ring guides 1030 are cutout portions of z-plane pedestal component 1000 and are configured to support and secure at least two of the three containment rings housing each of rings 200, 610, and 620 in position relative to the other rings. Connection apertures 1040 are provided to secure two z-plane pedestal components 1000 together. A total of four z-plane pedestal components 1000 are used to assemble a single pedestal.

Figure 11:
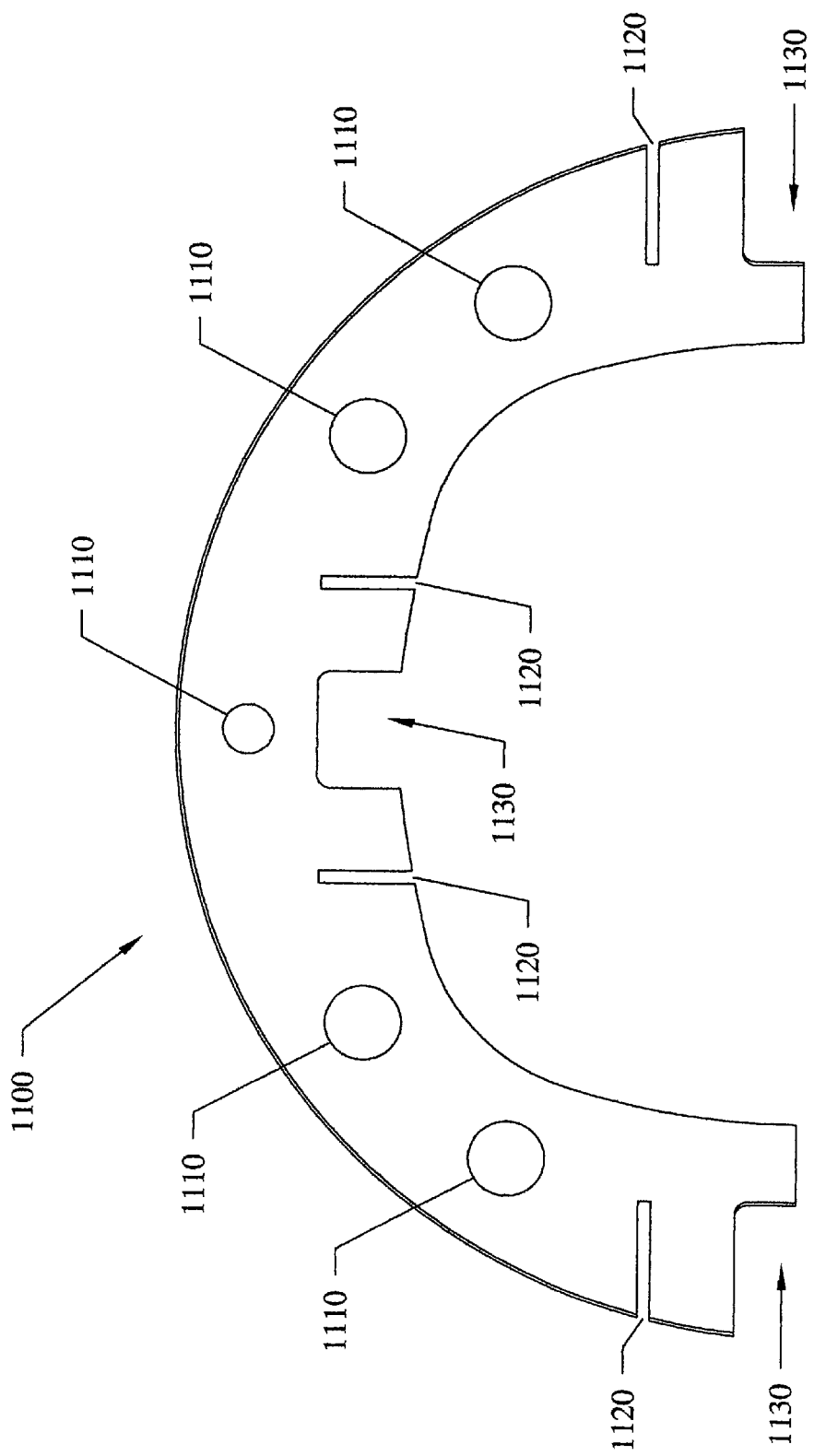
FIG. 11 is a top view of a y-plane pedestal component in accordance with a preferred embodiment of the present invention.

Referring now to FIG. 11, a top view of a y-plane pedestal component 1100 in accordance with a preferred embodiment of the present invention comprises: one or more optional cooling apertures 1110; assembly slots 1120; ring guides 1130; and connection apertures 1040. Y-plane pedestal component 1100 is one component used in conjunction with other similar components to create a support pedestal. Y-plane pedestal component 1100 is preferably manufactured from a lightweight rigid material such as heavy-duty plastics or ceramics. The material should be relatively resistant to the effects of heat. One such material is Vespel® manufactured by Dupont®.

Optional cooling apertures 1110 provides for heat dissipation during operation of the preferred embodiments of the present invention. Assembly slots 1120 are provided to allow the various pedestal components to fit together. Ring guides 1130 are cutout portions of z-plane pedestal component 1100 and are configured to support and secure at least two of the three containment rings housing each of rings 200, 610, and 620 in position relative to the other rings.

Connection apertures 1140 are provided to secure two y-plane pedestal components 1100 together. A total of four y-plane pedestal components 1000 are used to assemble a single pedestal.

Figure 12:
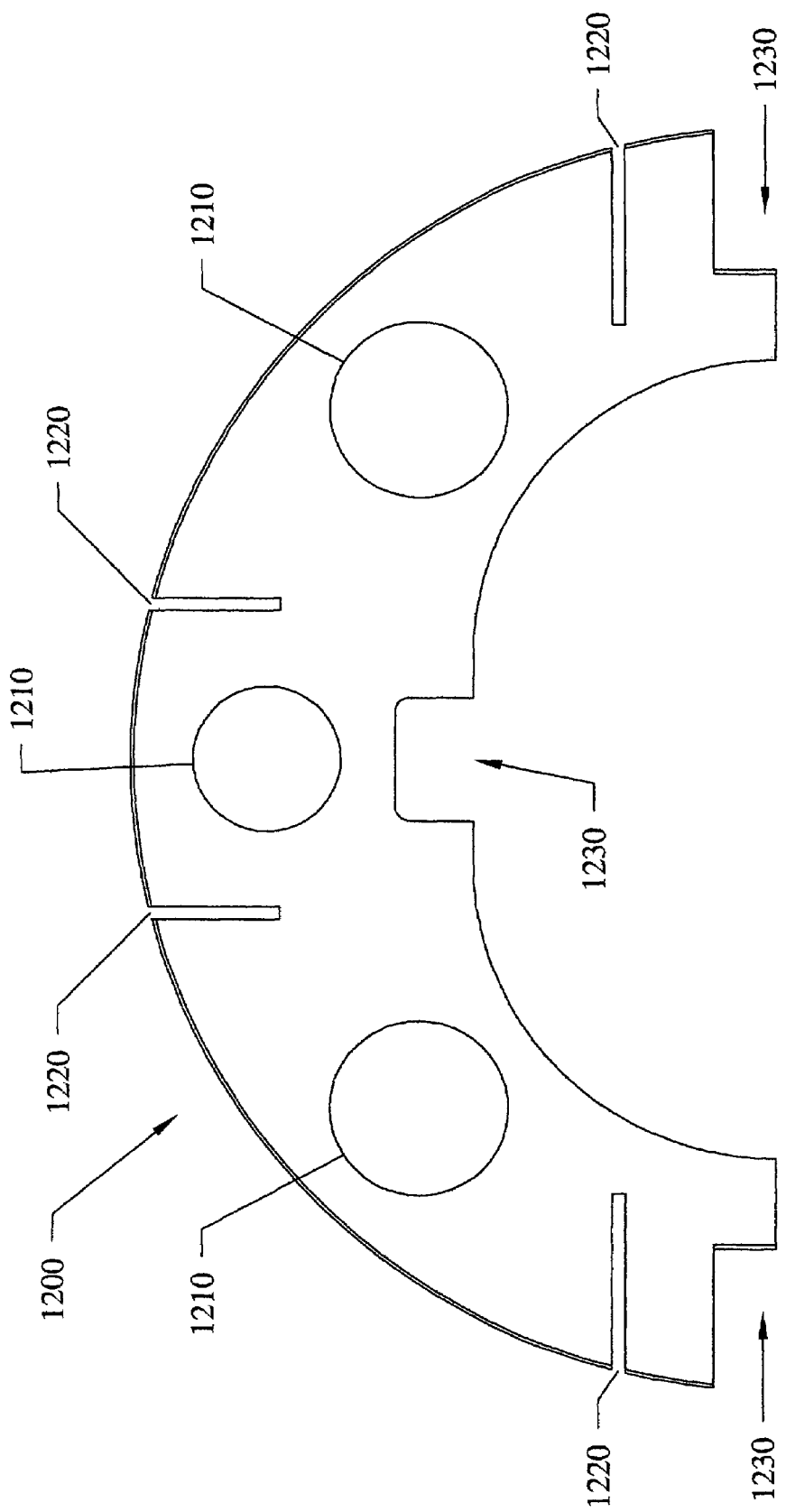
FIG. 12 is a top view of a x-plane pedestal component in accordance with a preferred embodiment of the present invention.

Referring now to FIG. 12, a top view of a x-plane pedestal component 1200 in accordance with a preferred embodiment of the present invention comprises: one or more optional cooling apertures 1210; assembly slots 1220; ring guides 1230; and connection apertures 1240. X-plane pedestal 1000 is one component used in conjunction with other similar components to create a support pedestal. X-plane 1200 is preferably manufactured from a lightweight rigid material such as heavy-duty plastics or ceramics. The material should be relatively resistant to the effects of heat. One such material is Vespel® manufactured by Dupont®.

Optional cooling apertures 1210 provides for heat dissipation during operation of the preferred embodiments of the present invention. Assembly slots 1220 are provided to allow the various pedestal components to fit together. Ring guides 1230 are cu-out portions of x-plane pedestal component 1200 and are configured to support and secure at least two of the three containment rings housing each of rings 200, 610, and 620 in position relative to the other rings. Connection apertures 1240 are provided to secure two x-plane pedestal components 1200 together. A total of four x-plane pedestal components 1200 are used to assemble a single pedestal.

Figure 13:
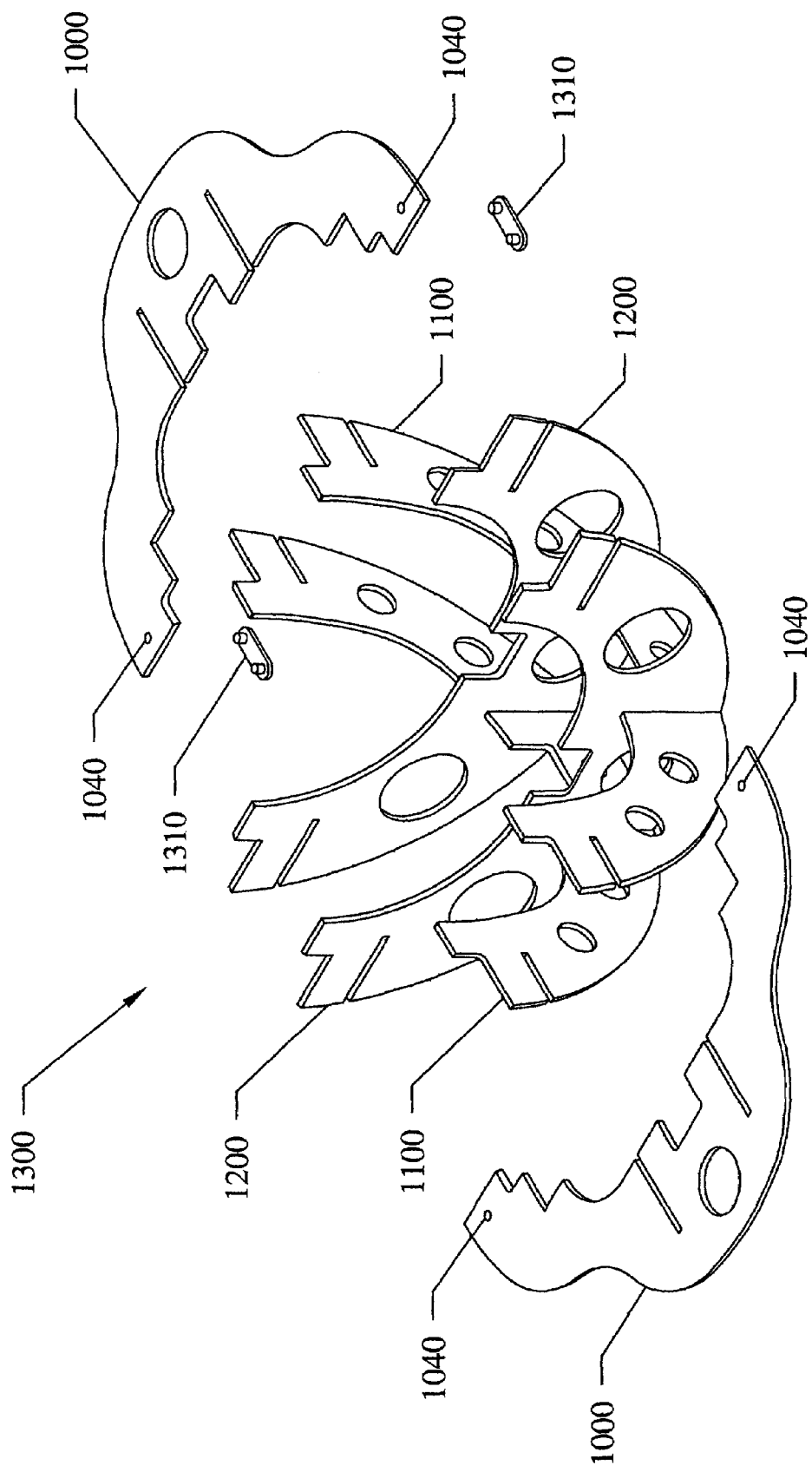
FIG. 13 is an exploded view of a half pedestal in accordance with a preferred embodiment of the present invention.

Referring now to FIG. 13, an exploded view of a half pedestal 1300 in accordance with a preferred embodiment of the present invention comprises: two z-plane pedestal components 1000; two y-plane pedestal components 1100; two x-plane pedestal components 1200; and a pair of connectors 1310. Assembly slots 1020, 1120, and 1220 are configured to slide into one another, allowing for assembly of half pedestal 1300. Once the pedestal components are assembled, connecters 1310 are inserted into assembly apertures 1040, thereby securing z-planes 1000 together and, in turn, fixing the remaining pedestal components in place.

Figure 14:
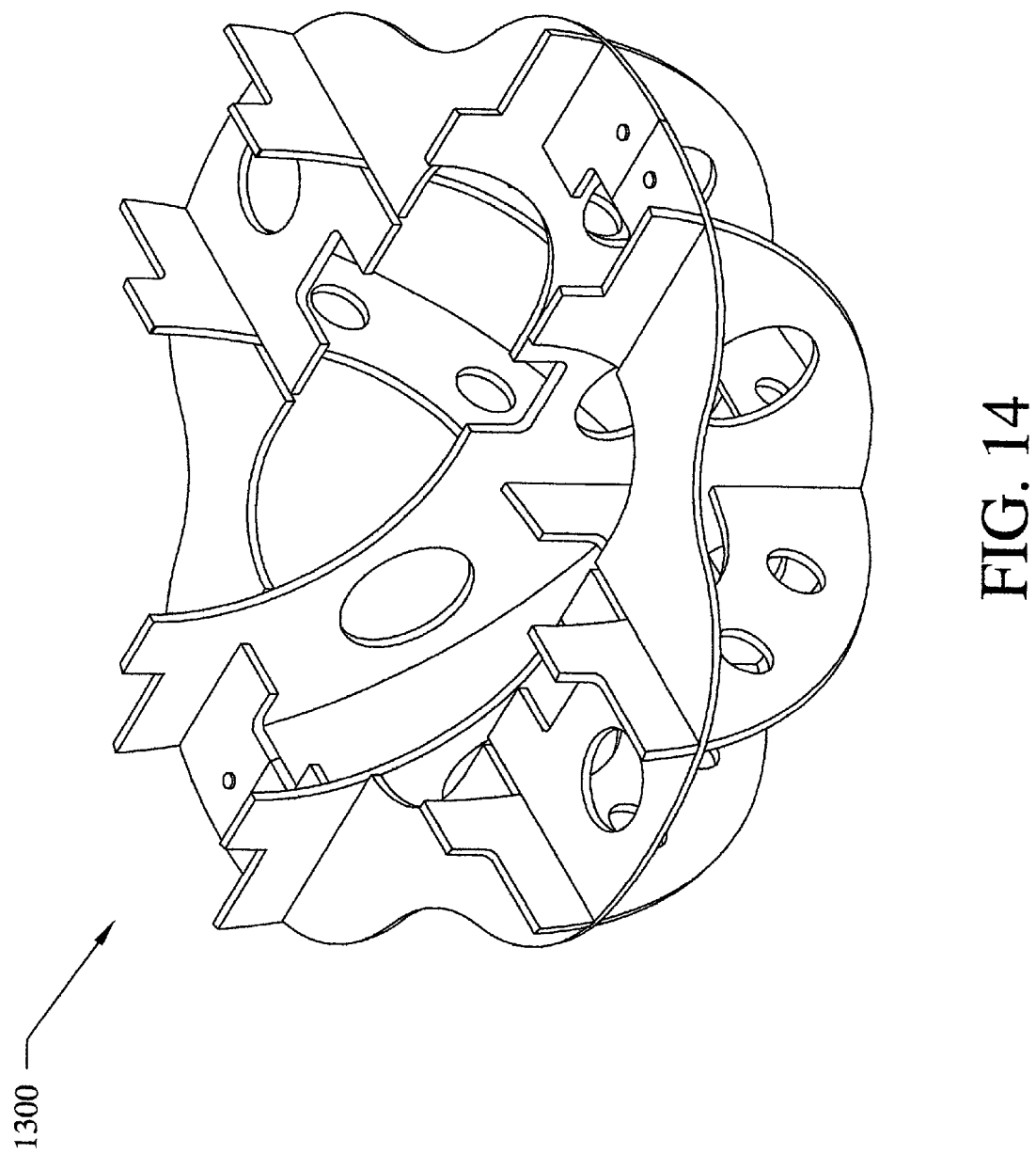
FIG. 14 is an perspective view of an assembled half pedestal in accordance with a preferred embodiment of the present invention.

Referring now to FIG. 14, a perspective view of the assembled half pedestal 1300 of FIG. 13 is depicted.

Figure 15:
FIG. 15 is an exploded view of a complete pedestal in accordance with a preferred embodiment of the present invention.

Referring now to FIG. 15, an exploded view of two half pedestals 1300 in accordance with a preferred embodiment of the present invention is depicted. As shown in FIG. 15, the two half pedestals 1300 are identical in form and are comprised of the same number and shape of pedestal components.

Figure 16:
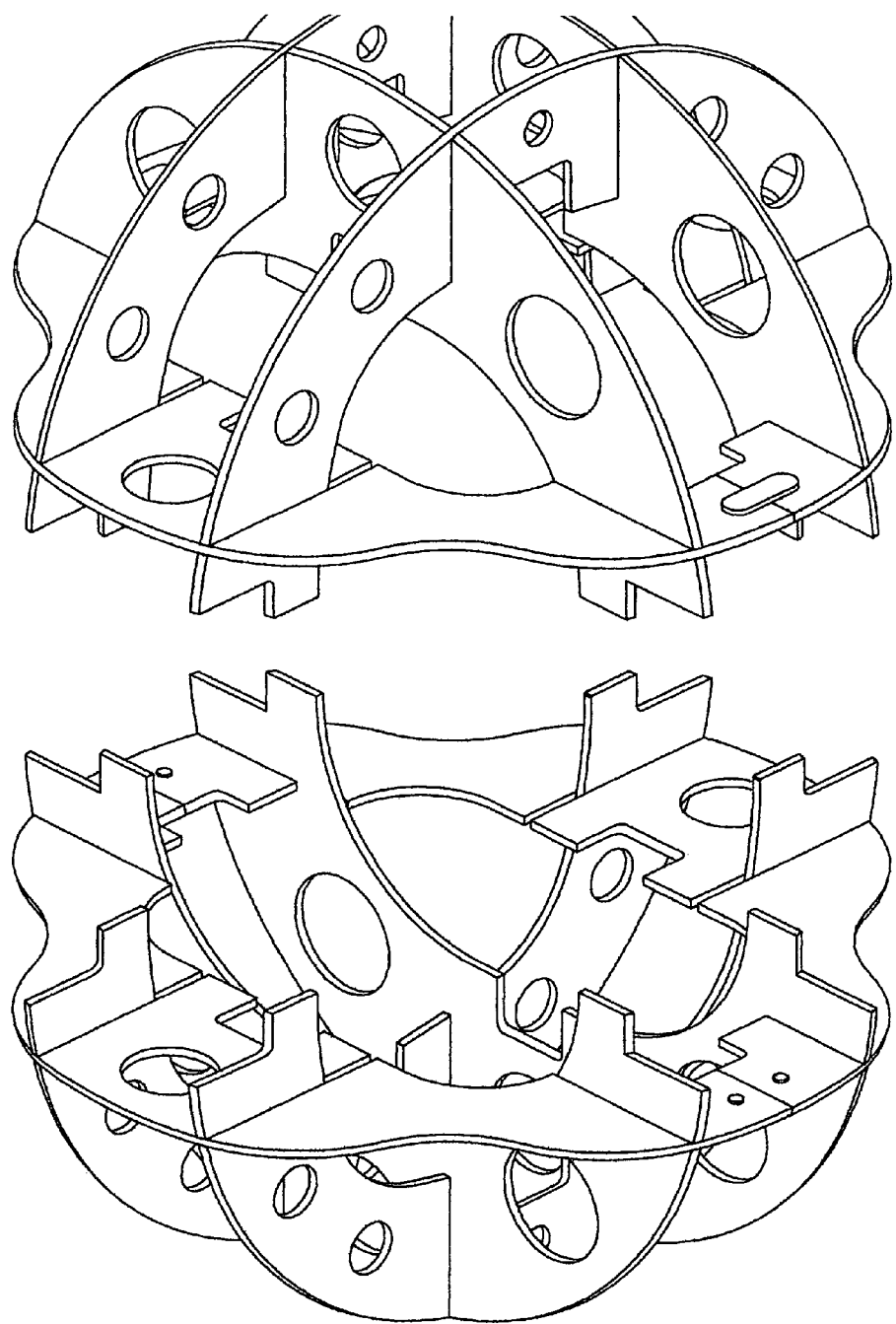
FIG. 16 is a perspective view of two pedestal halves in accordance with a preferred embodiment of the present invention.
Figure 17:
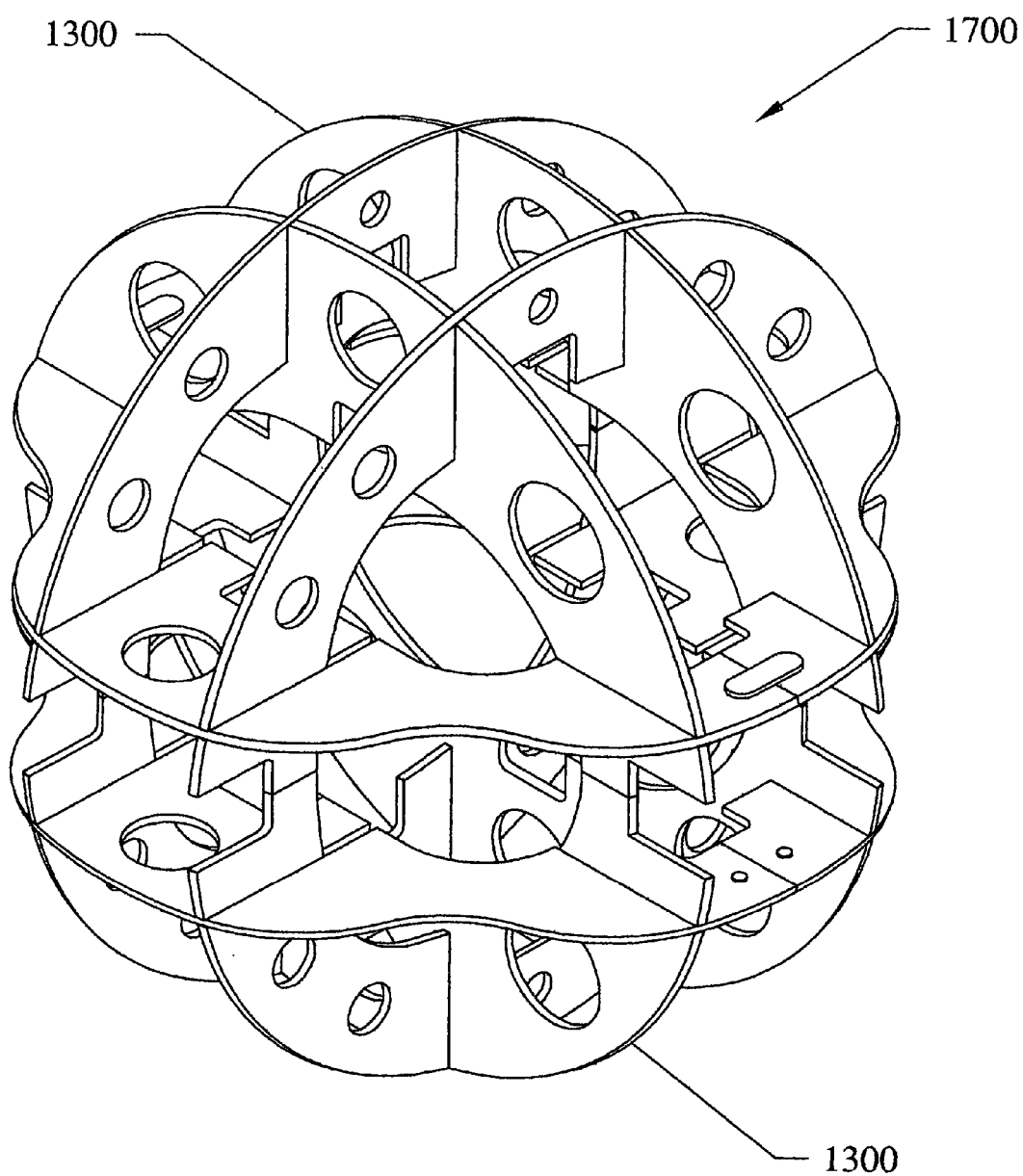
FIG. 17 is a perspective view of an assembled pedestal in accordance with a preferred embodiment of the present invention.

Referring now to FIG. 16, a perspective view of two assembled pedestal halves 1300 in accordance with a preferred embodiment of the present invention are depicted;

Referring now to FIG. 17, a perspective view of an assembled pedestal 1700 in accordance with a preferred embodiment of the present invention is depicted. As shown in FIG. 17, assembled pedestal 1700 comprises two half pedestals 1300.

Figure 18:
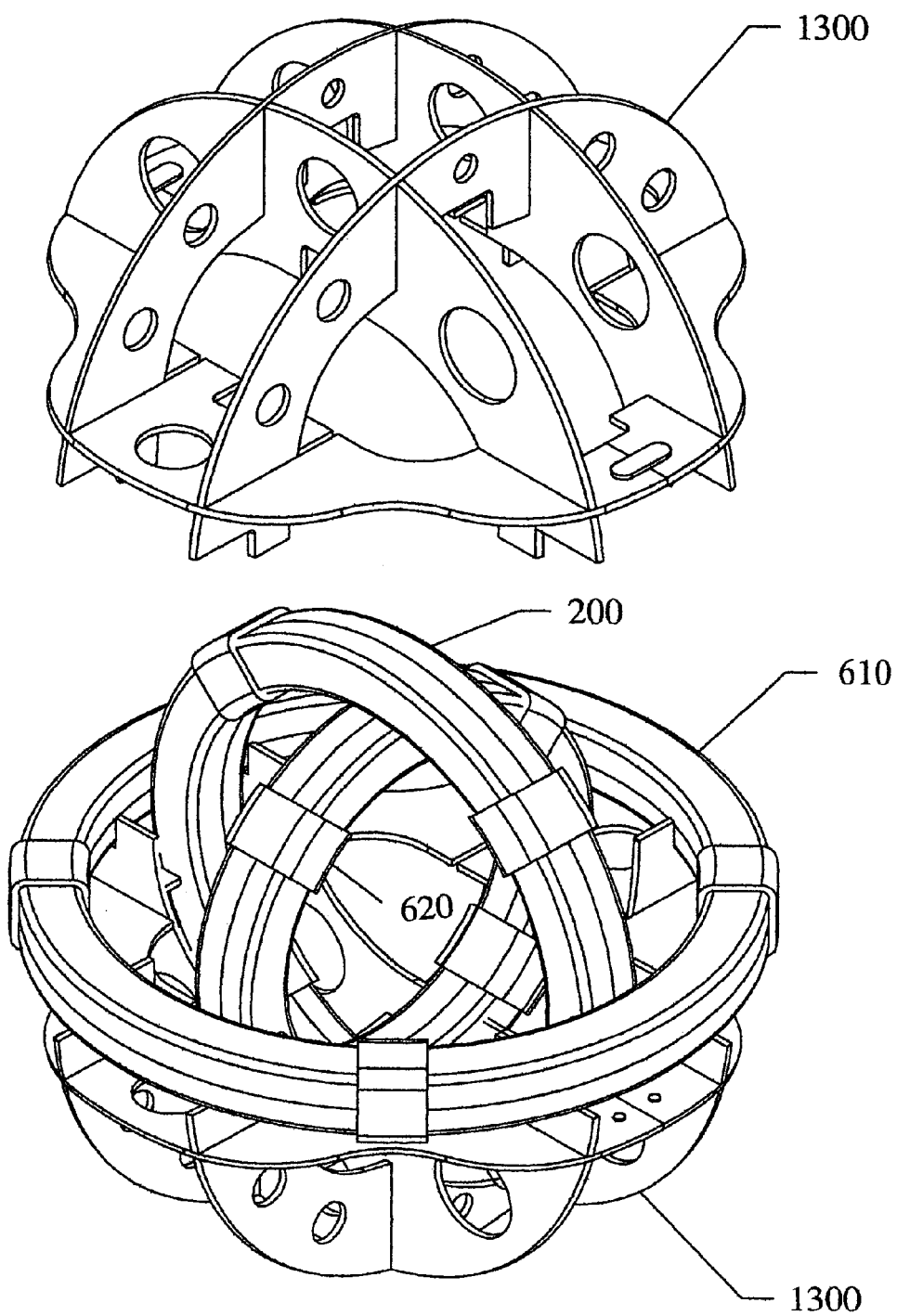
FIG. 18 is a perspective view of two pedestal halves with one pedestal half supporting the three gyroscopic rings in accordance with a preferred embodiment of the present invention.

Referring now to FIG. 18, a perspective view of two pedestal halves 1300 supporting gyroscopic rings 200, 610, and 620 in accordance with a preferred embodiment of the present invention is depicted. As shown in FIG. 18, rings 200, 610, and 620 are fixed in position by ring guides 1030, 1130, and 1230.

Figure 19:
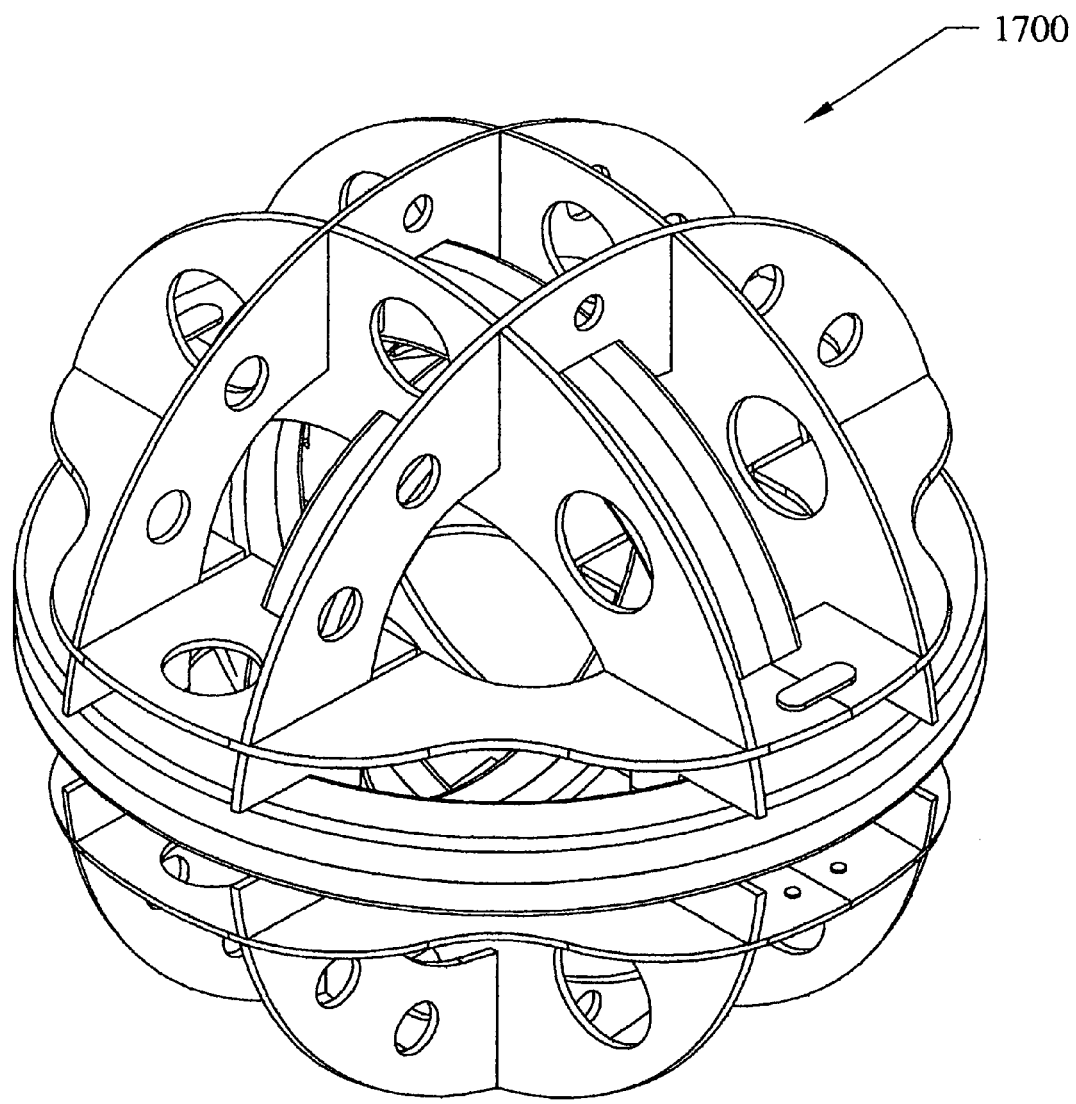
FIG. 19 is a perspective view of an assembled pedestal containing the three gyroscopic rings in accordance with a preferred embodiment of the present invention.

Referring now to FIG. 19, a perspective view of assembled pedestal 1700 containing gyroscopic rings 200, 610, and 620 in accordance with a preferred embodiment of the present invention is depicted.

Figure 20:
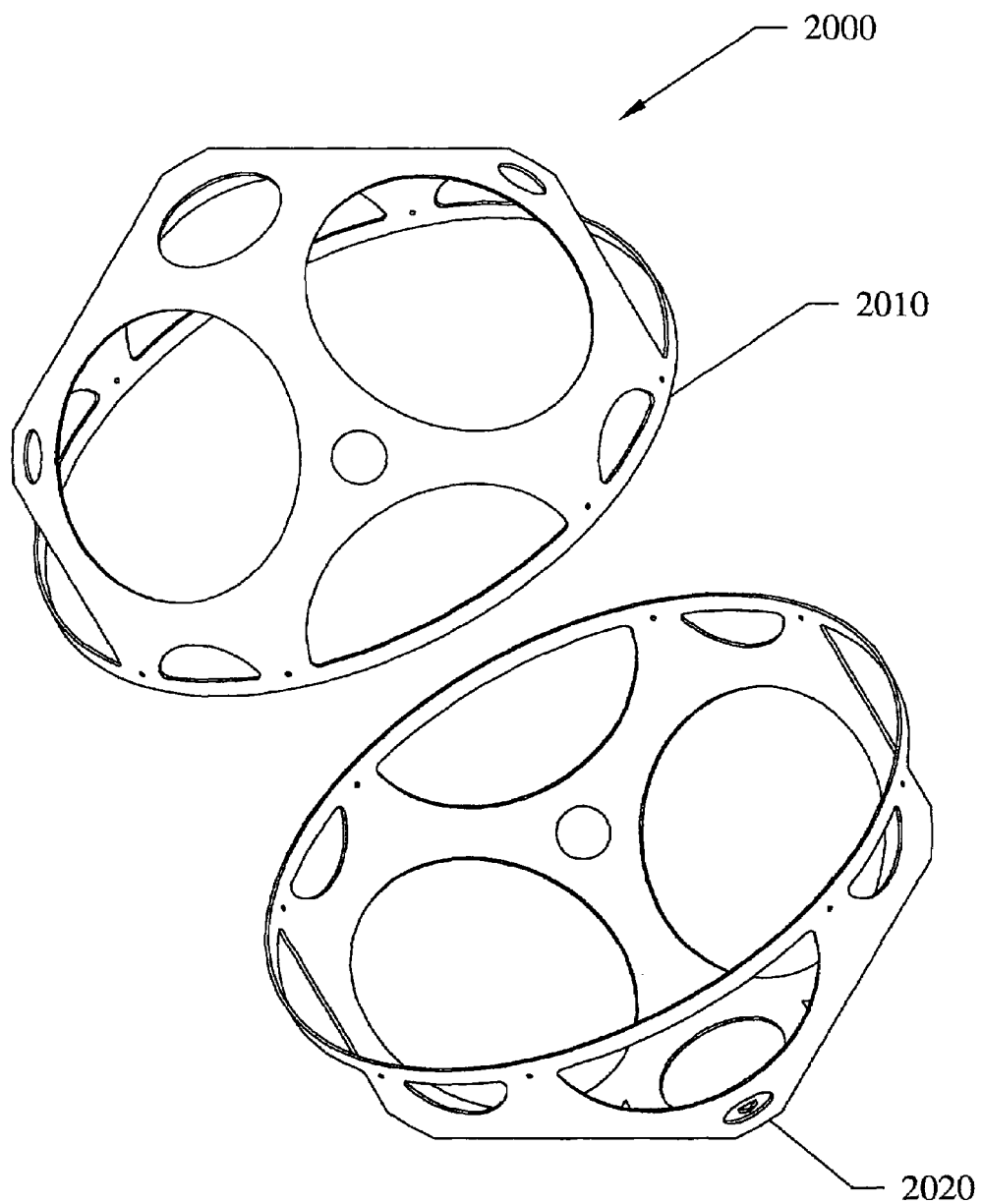
FIG. 20 is perspective view of an alternative housing in accordance with a preferred embodiment of the present invention.

Referring now to FIG. 20, an exploded view of an alternative preferred embodiment of a housing 2000 for assembled pedestal 1700 containing gyroscopic rings 200, 610, and 620 in accordance with a preferred embodiment of the present invention is depicted. As shown in FIG. 20, housing 2000 comprises an upper housing 2010 and a lower housing 2020.

Figure 21:
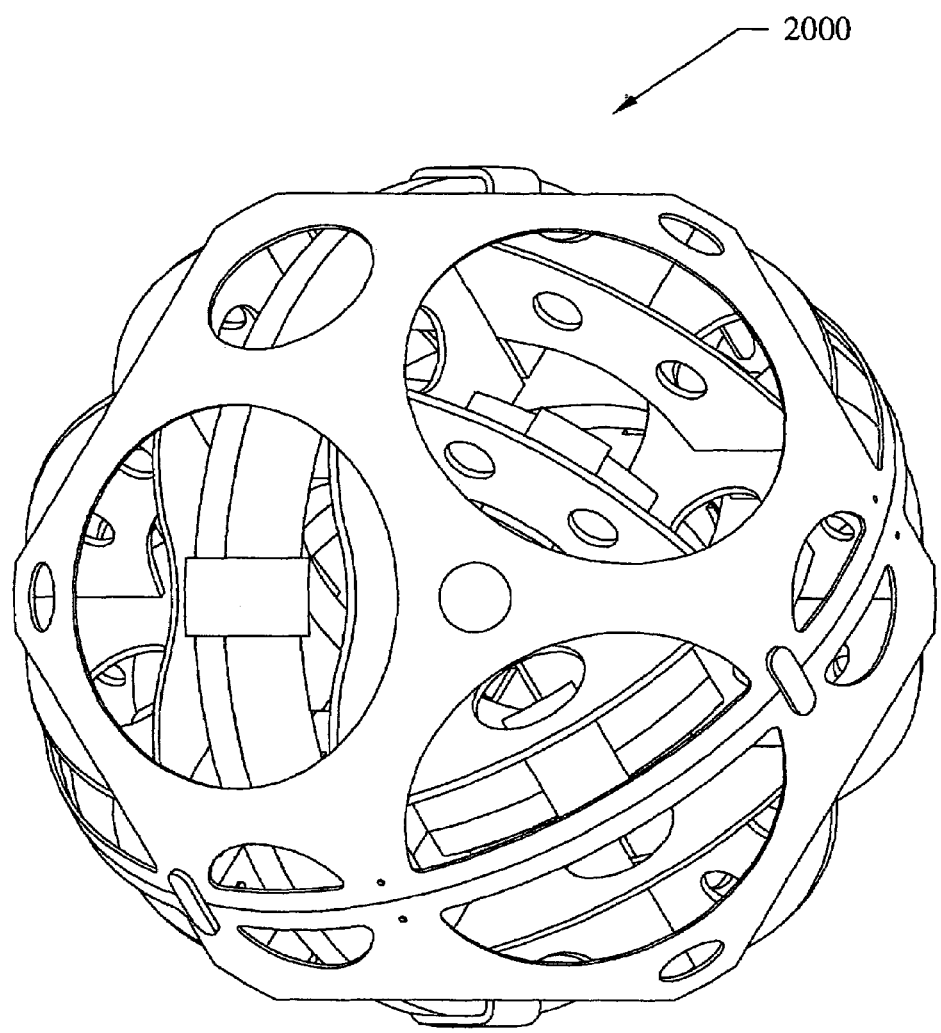
FIG. 21 is a perspective view of the housing containing the assembled pedestal and the three gyroscopic rings in accordance with a preferred embodiment of the present invention.
Figure 22:
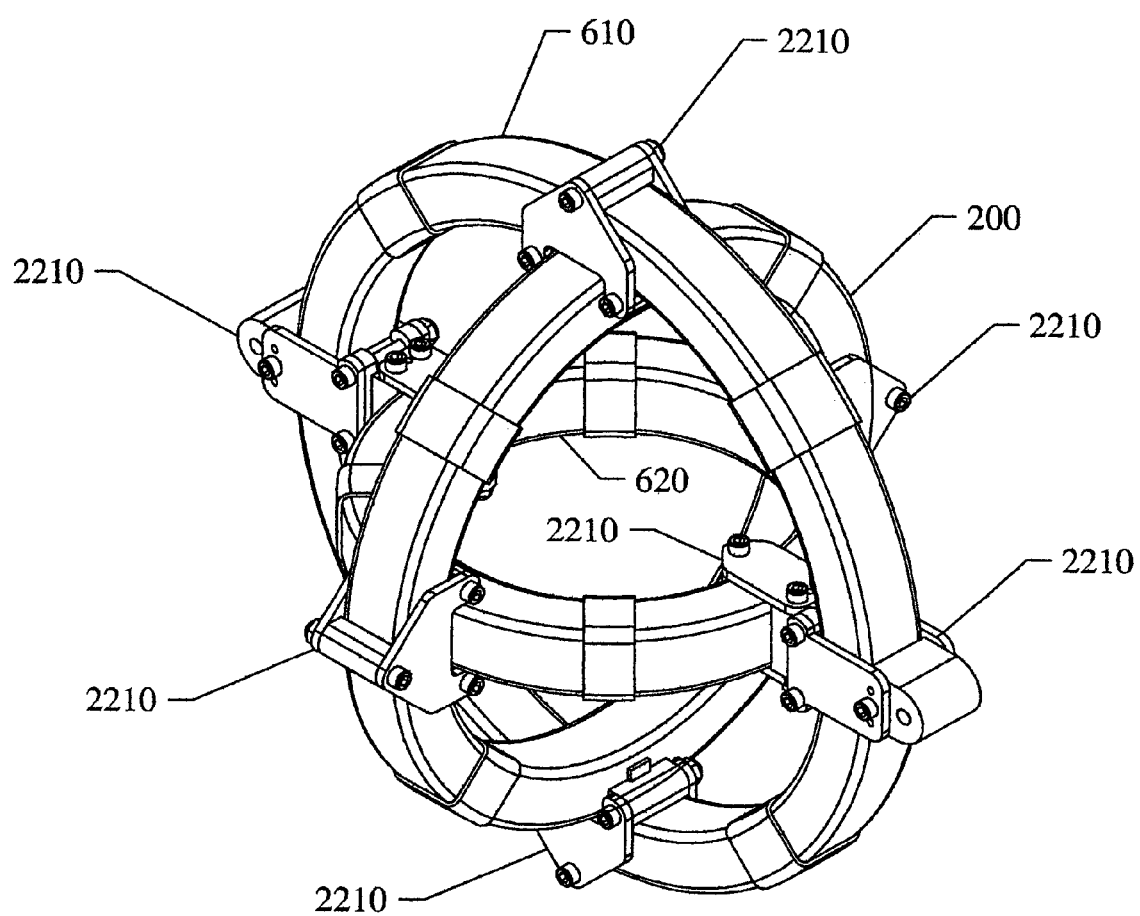
FIG. 22 is a perspective view of the three gyroscopic rings fixed in position relative to each other in accordance with an alternative preferred embodiment of the present invention.

Referring now to FIG. 21, a perspective view of housing 1700 containing the assembled pedestal 1700 and gyroscopic rings 200, 610, and 620 in accordance with a preferred embodiment of the present invention;

Referring now to FIG. 22, a perspective view of gyroscopic rings 200, 610, and 620 with the rings fixed in position relative to each other in accordance with an alternative preferred embodiment of the present invention is depicted. As shown in FIG. 22, rings 200, 610, and 620 are fixed in position by a series of ring clamps 2210. Each ring clamp 2210 secures two rings to each other, preventing the rings from moving relative to each other.

Figure 23:
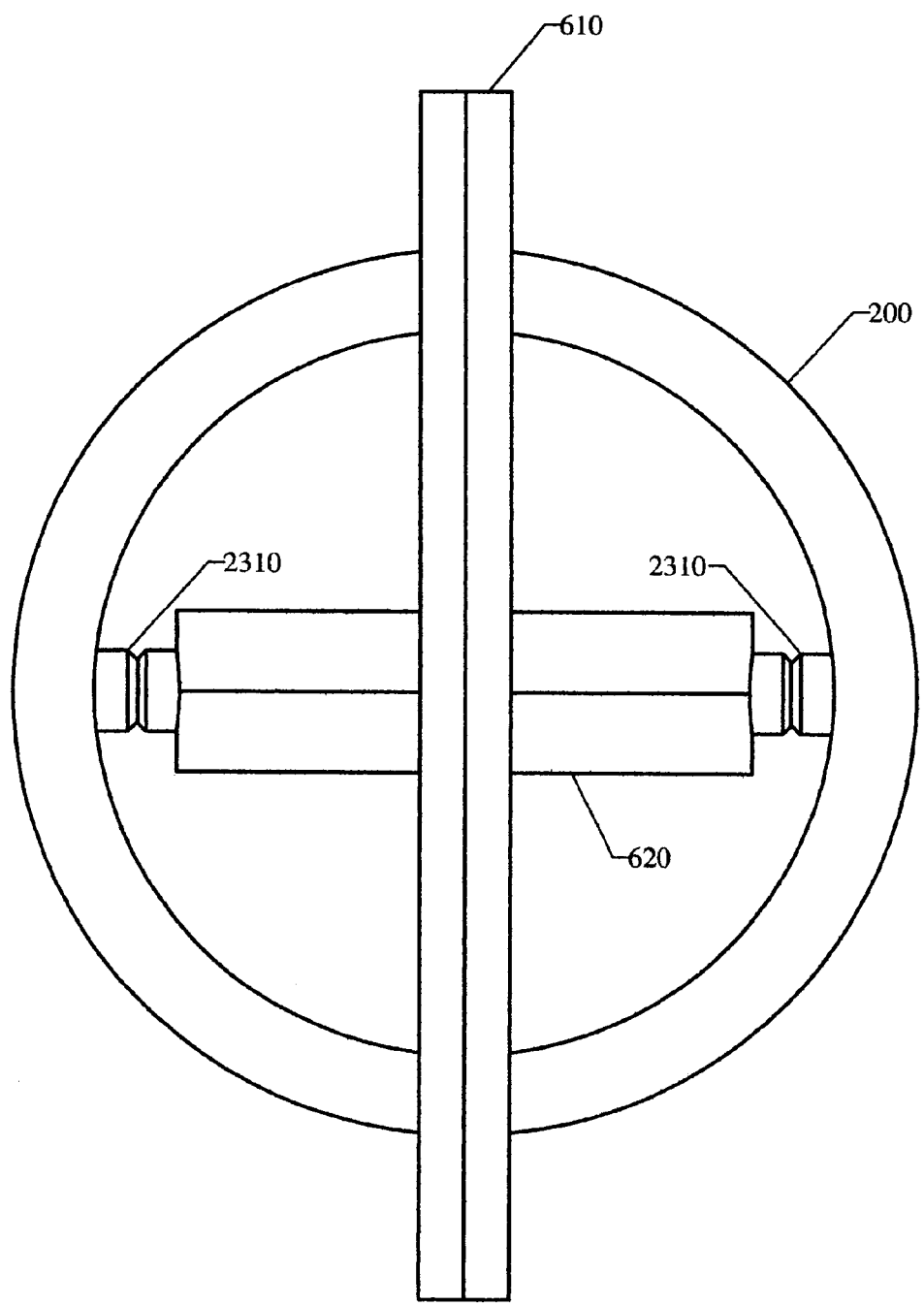
FIG. 23 is a plan view of the three gyroscopic rings connected to each other by a series of rotatable joints.

Referring now to FIG. 23, a plan view of gyroscopic rings 200, 610, and 620 is depicted. As shown in FIG. 23, rings 200, 610, and 620 are connected to each other by a series of rotatable joints 2310. Rotatable joints 2310 are configured to allow rings 200, 610, and 620 to rotate about their respective axis, thereby changing the relationship of the planes in which their ring-like masses rotate. Rotatable joints 2310 are any type of rotating members suitable for allowing the movement of the rings relative to each other. One end of each rotatable joint 2310 is fixed to one ring and the other end of each rotatable joint 2310 is affixed to another ring. By adjusting the relative position of rings 200, 610, and 620 relative to each other, the equal force presence generated by the angular momentum of rings 200, 610, and 620 can be changed. This allows for directional control. Master control program 825 of FIG. 8 is logically connected to rotatable joints 2310 and is configured to control the movement of rotatable joints 2310, thereby controlling the movement of rings 200, 610, and 620. The logical connection to rotatable joints 2310 may be a physical connection comprising one or more wires or a wireless connection.

Figure 24:
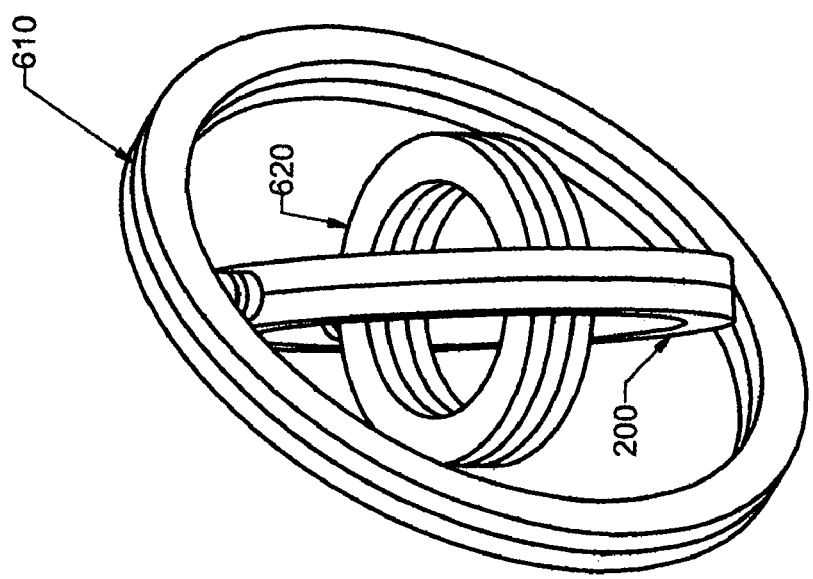
FIG. 24 is a perspective view of the three gyroscopic rings connected to each other by a series of rotatable joints.

Referring now to FIG. 24, a perspective view of gyroscopic rings 200, 610, 620 connected to each other by a series of rotatable joints is depicted.

Figure 25:
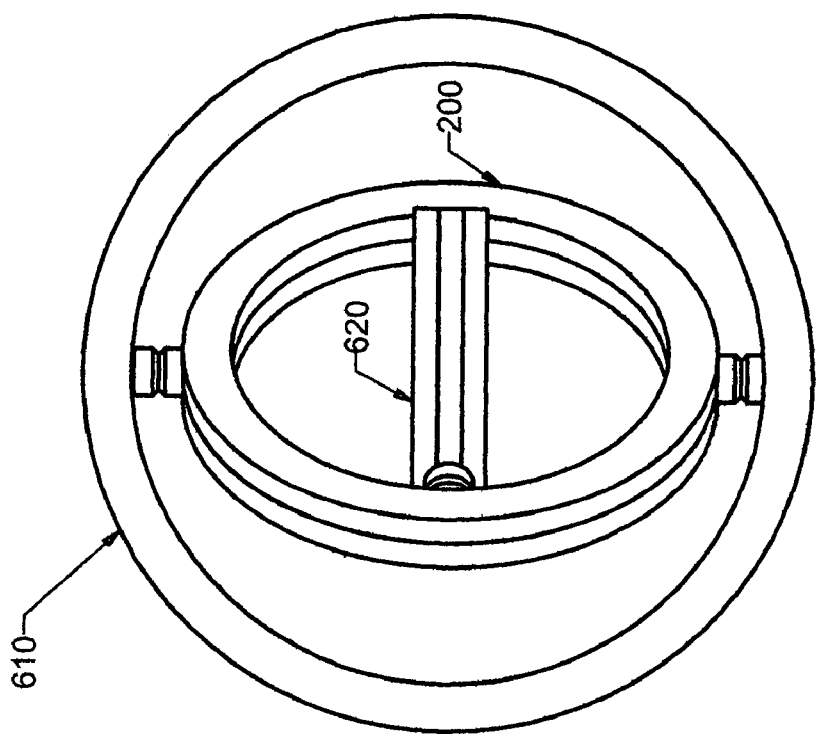
FIG. 25 is another perspective view of the three interconnected gyroscopic rings connected to each other by a series of rotatable joints.

Referring now to FIG. 25, another perspective view of gyroscopic rings 200, 610, and 620 connected to each other by a series of rotatable joints is depicted.

Figure 26:
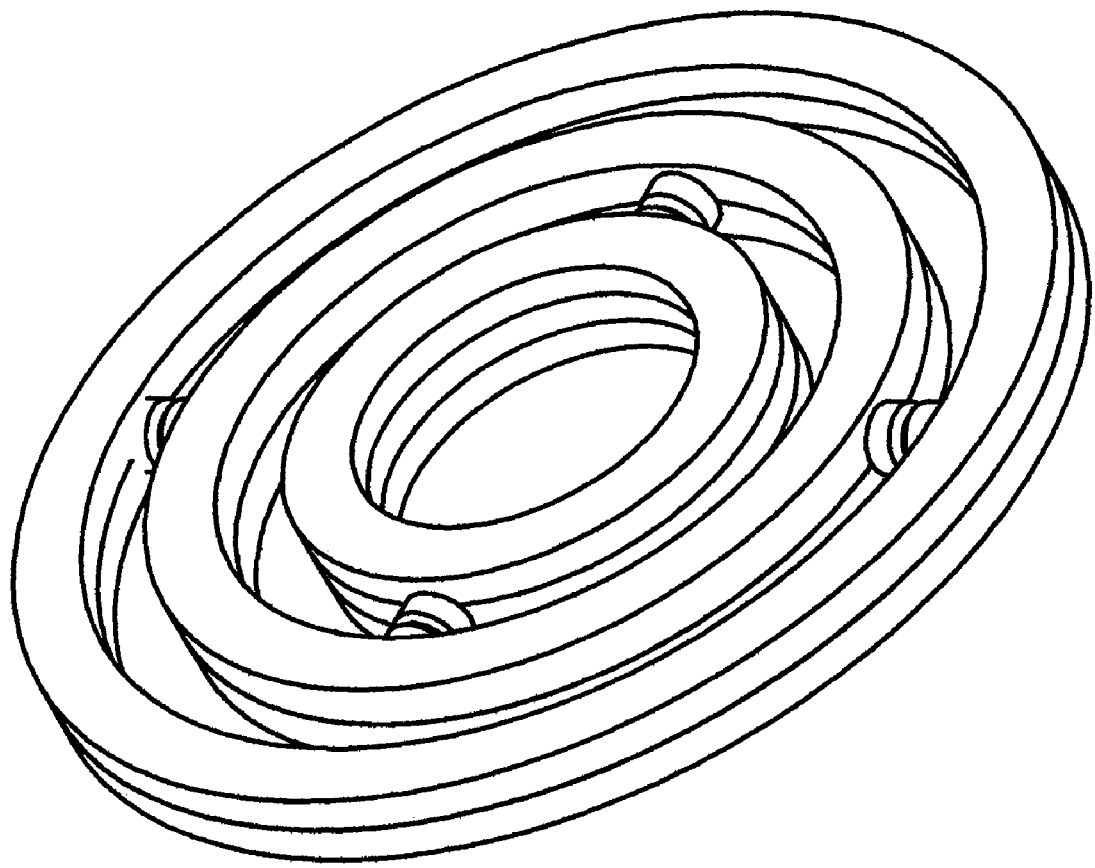
FIG. 26 is a perspective view of the three gyroscopic rings rotated so as to be contained in a single plane.

Referring now to FIG. 26, a perspective view of gyroscopic rings 200, 610, and 620 rotated so as to be contained in a single plane is depicted.

Yet another exemplary embodiment of a preferred implementation of the present invention may be an amusement apparatus capable of resisting rotational movement from an external source, including manipulation by a human being. In this embodiment, an optional handle or handles 705, as shown in FIG. 7, may be affixed to the exterior surface of housing 700. When the apparatus is energized, the three ring-like gyroscopes are spun up enough to generate a level of angular momentum capable of resisting external torque. In this configuration, a human can grasp the housing 700 or handles 705 and attempt to rotate housing 700 and feel the resistance of the apparatus. This amusement apparatus will provide entertainment as attempts to manipulate the position of the apparatus take place.

While the present invention has been particularly shown and described with reference to preferred exemplary embodiments thereof, it will be understood by those skilled in the art that various changes in form and details may be made therein without departing from the spirit and scope of the invention. For example, the exact number of windings used to create the brushless motors and the implementation of the control circuitry allow for many variations and equivalent embodiments without varying in significance. Similarly, the size of the various gyroscopic rings is limited only by the cost and manufacturing limitations associated with increasing the size of the gyroscopic rings and the availability of suitable material for ensuring that the density of the rings creates the desired equal angular momentum for each gyroscopic ring at any given angular velocity. Finally, it is anticipated that advances in the art of suspended rotors will eventually allow the creation of a propulsion system where there is no physical contact between the rotor and the stator element. In this case, the rotor would be held in place by magnetic fields or other mechanisms.

The invention claimed is:

1. An apparatus comprising:
   a first ring-like mass rotating in a first plane, said first ring-like mass comprising a first material, said first material comprising a first density, said first ring-like mass being contained within a first containment ring;
   a second ring-like mass rotating in a second plane, said second ring-like mass comprising a second material, said second material comprising a second density, said second ring-like mass being contained within a second containment ring;
   a third ring-like mass rotating in a third plane, said third ring-like mass comprising a third material, said third material comprising a third density, said third ring-like mass being contained within a third containment ring, wherein said first density is different from said second density and said third density; and said second density is different from said third density;
   a first rotatable joint connecting said first containment ring to said second containment ring;
   a second rotatable joint connecting said second containment ring to said third containment ring; and
   a control program, said control program being configured to control the planar orientation of at least one of said first ring-like mass and said second ring-like mass and said third ring-like mass.

2. The apparatus of claim 1 wherein:
   said first rotating ring-like mass comprises a titanium metal rotating ring-like mass;
   said second rotating ring-like mass comprises a constructed from a stainless steel rotating ring-like mass; and
   said third rotating ring-like mass comprises a tungsten nickel alloy metal rotating ring-like mass.

3. The apparatus of claim 1 wherein:
   said first rotating ring-like mass is constructed from a titanium metal having a density of 4.420 g/cc;
   said second rotating ring-like mass is constructed from a stainless steel metal having a density of 7.886 g/cc; and
   said third rotating ring-like mass is constructed from tungsten nickel alloy metal having a density of 17.000 g/cc.

4. The apparatus of claim 1 wherein said control program is configured to actuate at least one of said first and second rotatable joints, thereby altering the planar orientation of at least one of said first containment ring said second containment ring and said third containment ring.

5. The apparatus of claim 1 further comprising a housing, said housing containing said containment rings, said rotatable joints and said ring-like masses.

6. The apparatus of claim 1 wherein:
   said first ring-like mass generates a first angular momentum;
   said second ring-like mass generates a second angular momentum;
   said third ring-like mass generates a third angular momentum; and
   said first, second, and third angular momentums are equal.

7. The apparatus of claim 6 wherein:
   said first plane is substantially perpendicular to said second plane and said third plane;
   said second plane is substantially perpendicular to said third plane; and
   said first, second, and third angular momentums are equal.

8. The apparatus of claim 6 wherein:
   said first plane is substantially non-perpendicular to at least one of said second plane or said third plane;
   said second plane is substantially non-perpendicular to at least one of said first plane or said third plane; and
   said first angular momentum is unequal to at least one of said second and third angular momentums.

9. A method comprising the steps of:
   rotating a first ring-like mass rotating in a first plane, said first ring-like mass comprising a first material, said first material comprising a first density, said first ring-like mass generating a first angular momentum, said first ring-like mass being contained in a first containment ring;
   rotating a second ring-like mass rotating in a second plane, said second ring-like mass comprising a second material, said second material comprising a second density, said second ring-like mass generating a second angular momentum, said second ring-like mass being contained in a second containment ring;
   rotating a third ring-like mass rotating in a third plane, said third ring-like mass comprising a third material, said third material comprising a third density, said third ring-like mass generating a third angular momentum, said third ring-like mass being contained in a third containment ring;
   wherein a first rotatable joint connects said first containment ring to said second containment ring and a second rotatable joint connects said second containment ring to said third containment ring.

10. The method of claim 9 wherein:
    said first plane is substantially perpendicular to said second plane and said third plane;
    said second plane is substantially perpendicular to said third plane; and
    said first, second, and third angular momentums are substantially equal.

11. The method of claim 9 wherein:
    said first plane is substantially non-perpendicular to said second plane and said third plane;
    said second plane is substantially non-perpendicular to said third plane; and
    said first, second, and third angular momentums are unequal.

12. The method of claim 9 further comprising the step of varying said first, second, and third angular momentums by activating a control program.

13. An apparatus comprising:
    a first ring-like mass rotating in a first plane, said first ring-like mass comprising a first material, said first material comprising a first density;
    a second ring-like mass rotating in a second plane, said second ring-like mass comprising a second material, said second material comprising a second density;
    a third ring-like mass rotating in a third plane, said third ring-like mass comprising a third material, said third material comprising a third density, wherein said first density is different from said second density and said third density; and said second density is different from said third density;
a first containment ring, said first ring-like mass being contained within said first containment ring;
a second containment ring, said second ring-like mass being contained within said second containment ring;
a third containment ring, said third ring-like mass being contained within said third containment ring;
a first rotatable joint connecting said first containment ring to said second containment ring;
a second rotatable joint connecting said second containment ring to said third containment ring; and a control program, said control program being configured to control the rotation of said first ring-like mass and said second ring-like mass and said third ring-like mass, and said control program being configured to control the planar orientation of said first ring-like mass and said second ring-like mass and said third ring-like mass.

14. The apparatus of claim 13 further comprising a housing, said housing containing said apparatus.

15. The apparatus of claim 13 further comprising a vehicle, said vehicle containing said apparatus.

* * * * *